US009846350B2

(12) United States Patent
Takeshita et al.

(10) Patent No.: US 9,846,350 B2
(45) Date of Patent: Dec. 19, 2017

(54) LENS BARREL, METHOD OF CONTROLLING LENS BARREL, CAMERA BODY, METHOD OF CONTROLLING CAMERA BODY, IMAGING DEVICE, AND METHOD OF CONTROLLING IMAGING DEVICE

(71) Applicant: FUJIFILM Corporation, Tokyo (JP)

(72) Inventors: Yukitaka Takeshita, Saitama (JP); Mitsuhiko Oka, Saitama (JP); Yuichi Kawanabe, Saitama (JP); Yi Pan, Saitama (JP); Shinji Otsuka, Saitama (JP); Kazuyoshi Azegami, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/584,858

(22) Filed: May 2, 2017

(65) Prior Publication Data

US 2017/0235090 A1 Aug. 17, 2017

Related U.S. Application Data

(63) Continuation of application No. PCT/JP2015/085645, filed on Dec. 21, 2015.

(30) Foreign Application Priority Data

Dec. 26, 2014 (JP) ................................. 2014-264006

(51) Int. Cl.
*H04N 5/225* (2006.01)
*H04N 5/232* (2006.01)
(Continued)

(52) U.S. Cl.
CPC ............... *G03B 13/32* (2013.01); *G02B 7/04* (2013.01); *G02B 7/08* (2013.01); *G02B 7/102* (2013.01);
(Continued)

(58) Field of Classification Search
CPC ............. H04N 5/2254; H04N 5/23212; H04N 5/23245; H04N 5/23296; G03B 13/32;
(Continued)

(56) References Cited

U.S. PATENT DOCUMENTS

| 4,893,145 A | * | 1/1990 | Matsuda | .................. G02B 7/10 |
| | | | | 359/824 |
| 5,969,889 A | * | 10/1999 | Iikawa | ..................... G02B 7/04 |
| | | | | 359/823 |

(Continued)

FOREIGN PATENT DOCUMENTS

| JP | 2-36807 U | 3/1990 |
| JP | 2007-178633 A | 7/2007 |

(Continued)

OTHER PUBLICATIONS

International Search Report, issued in PCT/R2015/085645, PCT/ISA/210, dated Mar. 29, 2016.
(Continued)

*Primary Examiner* — Daniel M Pasiewicz
(74) *Attorney, Agent, or Firm* — Birch, Stewart, Kolasch & Birch, LLP

(57) ABSTRACT

There is provided a lens barrel that can easily and reliably prevent an erroneous operation at the time of switching of a manual focus mode.

A lens barrel body houses an imaging optical system including a focus lens. A focus operation ring rotates integrally with a first connection ring about an optical axis of the imaging optical system. A second connection ring is movable between an engagement position at which the second connection ring is engaged with the first connection ring and a cam ring and a disengagement position at which the second connection ring is not engaged with both of the first connection ring and the cam ring. A switching-operation ring is movable between a rotation-restriction position at which the
(Continued)

switching-operation ring moves the second connection ring to the engagement position and a rotation-allowable position at which the switching-operation ring moves the second connection ring to the disengagement position.

18 Claims, 18 Drawing Sheets

(51) Int. Cl.
G02B 7/04 (2006.01)
G02B 7/08 (2006.01)
G02B 7/10 (2006.01)
G03B 13/32 (2006.01)

(52) U.S. Cl.
CPC ....... *H04N 5/2254* (2013.01); *H04N 5/23212* (2013.01); *H04N 5/23245* (2013.01); *H04N 5/23296* (2013.01)

(58) Field of Classification Search
CPC . G03B 13/34; G02B 7/04; G02B 7/08; G02B 7/102
See application file for complete search history.

(56) References Cited

U.S. PATENT DOCUMENTS

| | | | |
|---|---|---|---|
| 7,969,672 B2 | 6/2011 | Harada et al. | |
| 9,013,607 B2 | 4/2015 | Taguchi et al. | |
| 9,235,026 B2 | 1/2016 | Taguchi et al. | |
| 2007/0147818 A1 | 6/2007 | Mori | |
| 2009/0279192 A1* | 11/2009 | Harada | G02B 7/04 359/825 |
| 2011/0026135 A1 | 2/2011 | Fujiwara | |
| 2011/0043936 A1 | 2/2011 | Mori | |
| 2012/0328277 A1 | 12/2012 | Nakata et al. | |
| 2013/0141624 A1* | 6/2013 | Tomizawa | H04N 5/23293 348/333.02 |
| 2013/0271860 A1* | 10/2013 | Arakawa | G02B 7/04 359/823 |
| 2013/0335589 A1* | 12/2013 | Yuge | H04N 5/225 348/222.1 |

FOREIGN PATENT DOCUMENTS

| | | |
|---|---|---|
| JP | 2011-33795 A | 2/2011 |
| JP | 2011-43706 A | 3/2011 |
| JP | 5028945 B2 | 9/2012 |
| JP | 2012-203341 A | 10/2012 |
| JP | 2013-7837 A | 1/2013 |
| JP | 2013-7839 A | 1/2013 |

OTHER PUBLICATIONS

Written Opinion of the International Searching Authority, issued in PCT/JP20 5/085645, PCT/ISA/237, dated Mar. 29, 2016.

\* cited by examiner

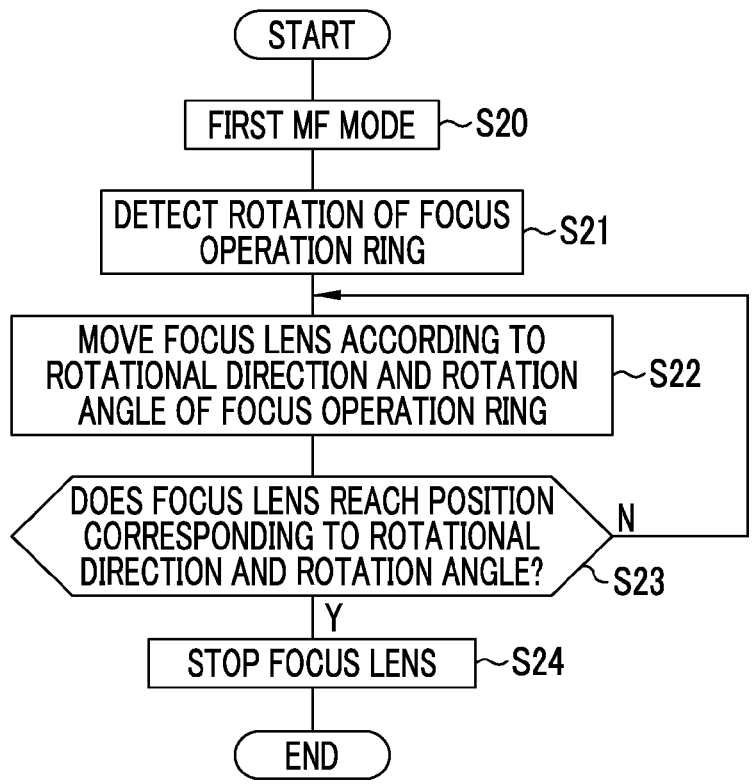
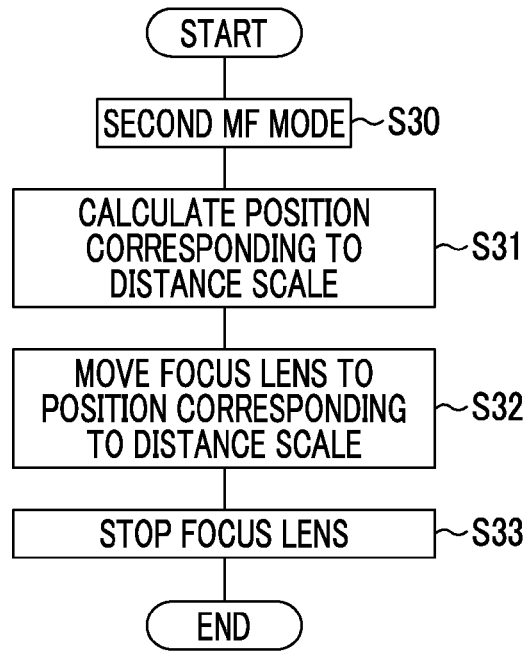

LENS BARREL, METHOD OF CONTROLLING LENS BARREL, CAMERA BODY, METHOD OF CONTROLLING CAMERA BODY, IMAGING DEVICE, AND METHOD OF CONTROLLING IMAGING DEVICE

CROSS-REFERENCE TO RELATED APPLICATION

This application is a Continuation of PCT International Application PCT/JP2015/085645 filed on 21 Dec. 2015, which claims priority under 35 USC 119(a) from Japanese Patent Application No. 2014-264006 filed on 26 Dec. 2014. The above application is hereby expressly incorporated by reference, in its entirety, into the present application.

BACKGROUND OF THE INVENTION

1. Field of the Invention

The present invention relates to a lens barrel having a manual focus function, a method of controlling the lens barrel, a camera body, a method of controlling the camera body, an imaging device, and a method of controlling the imaging device.

2. Description of the Related Art

A single lens reflex camera for an expert or the like has a manual focus function that allows a user to manually adjust a focus. A camera having this manual focus function includes an operation ring that is operated by a user and a drive unit that moves a focus lens according to the rotation angle or the angular position of the operation ring.

An operation ring is mounted on each of cameras disclosed in JP5028945B (corresponding to U.S. Pat. No. 7,969,672) and JP2013-7837A (corresponding to U.S. Pat. Nos. 9,013,607 and 9,235,026) so as to be movable between a first position and a second position in the direction of an optical axis of an imaging optical system including a focus lens. The operation ring is endlessly rotatable in a case in which the operation ring is present at the first position, and is rotatable about the optical axis within a limited angular range in a case in which the operation ring is present at the second position. Further, imaging is performed in a first manual focus mode in a case in which the operation ring is present at the first position. In the first manual focus mode, the focus lens is moved according to the rotation angle of the operation ring. On the other hand, imaging is performed in a second manual focus mode in a case in which the operation ring is present at the second position. In the second manual focus mode, the focus lens is moved according to the angular position of the operation ring. In the camera disclosed in JP2013-7837A, a distance scale is provided on the operation ring and an index is provided on a lens barrel body. In the second manual focus mode, the camera disclosed in JP2013-7837A moves the focus lens to a position at which an imaging distance corresponding to the distance scale set to the position of the index is obtained.

In the cameras disclosed in JP50289453 and JP2013-7837A, the operation ring is adapted to be rotatable and to be movable in the direction of the optical axis. For this reason, there is a possibility that an erroneous operation is caused at the time of switching of the first and second manual focus modes. For example, in a case in which a mode is changed to the first manual focus mode in order to finely adjust an imaging distance from the set value of the imaging distance after the imaging distance is set in the second manual focus mode, the imaging distance can be finely adjusted from this set value assuming that the operation ring can be moved to the first position from the second position in the direction of the optical axis without being rotated. However, the operation ring may be rotated by mistake in a case in which the operation ring is to be moved in the direction of the optical axis.

In regard to this erroneous operation, JP2013-7837A discloses a structure that electrically forbids processing corresponding to the rotation of the operation ring even though the operation ring rotates in the event that the operation ring is moved in the direction of the optical axis. Specifically, until a predetermined period has passed after the switching of the operation ring is detected, the movement of the focus lens corresponding to the rotation of the operation ring is inhibited even though the operation ring rotates.

However, a circuit for electrically preventing an erroneous operation needs to be separately provided in a countermeasure against the erroneous operation disclosed in JP2013-7837A. Further, since there is a variation in the time in which users switch the operation ring, the predetermined period needs to be set to be long to some extent in order to reliably prevent the erroneous operation. However, in a case in which the predetermined period is set to be long, time, which has passed until the rotation of the operation ring becomes effective after an operation for switching the operation ring, is lengthened. For this reason, users feel uncomfortable. On the contrary, in the event that the predetermined period is set to be short so that users do not feel uncomfortable, it is not possible to reliably prevent an erroneous operation.

SUMMARY OF THE INVENTION

An object of the invention is to provide a lens barrel, a method of controlling the lens barrel, a camera body, a method of controlling the camera body, an imaging device, and a method of controlling the imaging device that can easily and reliably prevent an erroneous operation at the time of switching of a manual focus mode.

A lens barrel of the invention comprises a lens barrel body, a focus operation member, a rotation restricting member, and a switching-operation member. The lens barrel body houses an imaging optical system including a focus lens. The focus operation member is mounted on the lens barrel body so as to be endlessly rotatable about an optical axis of the imaging optical system. The rotation restricting member is rotatable about the optical axis within a limited angular range. The rotation restricting member is movable between an engagement position at which the rotation restricting member is engaged with the focus operation member and a disengagement position at which the rotation restricting member is not engaged with the focus operation member in a direction of the optical axis. The switching-operation member is mounted on the lens barrel body so as to be movable in the direction of the optical axis. The switching-operation member is movable between a rotation-restriction position at which the switching-operation member moves the rotation restricting member to the engagement position to restrict the rotation of the focus operation member within the angular range and a rotation-allowable position at which the switching-operation member moves the rotation restricting member to the disengagement position to allow the endless rotation of the focus operation member.

It is preferable that the switching-operation member present at the rotation-allowable position is closer to the focus operation member than the switching-operation member present at the rotation-restriction position. It is preferable that the rotation restricting member is disposed closer to an inner diameter side of the lens barrel body than the focus operation member and the switching-operation member and is covered with the focus operation member and the switching-operation member in a case in which the switching-operation member is present at the rotation-allowable position. It is preferable that a distance scale is provided on a portion of the rotation restricting member exposed to the outside without being covered with the focus operation member in a case in which the switching-operation member is present at the rotation-restriction position.

It is preferable that the lens barrel further comprises a first sensor, a second sensor, a third sensor, and a drive unit. The first sensor detects the rotation of the focus operation member. The second sensor detects the angular position of the rotation restricting member. The third sensor detects the position of the switching-operation member. The drive unit moves the focus lens in the direction of the optical axis on the basis of outputs of the first sensor, the second sensor, and the third sensor.

It is preferable that the drive unit moves the focus lens on the basis of the output of the second sensor in a case in which the output of the third sensor represents that the switching-operation member is present at the rotation-restriction position.

It is preferable that the lens barrel further comprises a control unit controlling the drive unit. The control unit executes a first manual focus mode in a case in which the output of the third sensor represents that the switching-operation member is present at the rotation-allowable position. In the first manual focus mode, the control unit moves the focus lens according to a rotational direction and a rotation angle obtained on the basis of the output of the first sensor. The control unit executes a second manual focus mode in a case in which the output of the third sensor represents that the switching-operation member is present at the rotation-restriction position. In the second manual focus mode, the control unit moves the focus lens according to the angular position detected by the second sensor.

The invention provides a method of controlling a lens barrel that includes a lens barrel body, a focus operation member, a rotation restricting member, a switching-operation member, a first sensor, a second sensor, and a third sensor. The method comprises: executing a first manual focus mode in which the focus lens is moved according to a rotational direction and a rotation angle obtained on the basis of the output of the first sensor in a case in which the output of the third sensor represents that the switching-operation member is present at a rotation-allowable position; and executing a second manual focus mode in which the focus lens is moved according to the angular position detected by the second sensor in a case in which the output of the third sensor represents that the switching-operation member is present at a rotation-restriction position. The lens barrel body houses an imaging optical system including a focus lens. The focus operation member is mounted on the lens barrel body so as to be endlessly rotatable about an optical axis of the imaging optical system. The rotation restricting member is rotatable about the optical axis within a limited angular range. The rotation restricting member is movable between an engagement position at which the rotation restricting member is engaged with the focus operation member and a disengagement position at which the rotation restricting member is not engaged with the focus operation member in a direction of the optical axis. The switching-operation member is mounted on the lens barrel body so as to be movable in the direction of the optical axis. The switching-operation member is movable between the rotation-restriction position at which the switching-operation member moves the rotation restricting member to the engagement position to restrict the rotation of the focus operation member within the angular range and the rotation-allowable position at which the switching-operation member moves the rotation restricting member to the disengagement position to allow the endless rotation of the focus operation member. The first sensor detects the rotation of the focus operation member. The second sensor detects the angular position of the rotation restricting member. The third sensor detects the position of the switching-operation member.

The lens barrel according to claim 6 is detachably connected to a camera body of the invention. The camera body comprises a control unit that controls a drive unit of the lens barrel. The control unit executes a first manual focus mode in a case in which the output of the third sensor represents that the switching-operation member is present at the rotation-allowable position. In the first manual focus mode, the control unit moves the focus lens according to a rotational direction and a rotation angle obtained on the basis of the output of the first sensor. The control unit executes a second manual focus mode in a case in which the output of the third sensor represents that the switching-operation member is present at the rotation-restriction position. In the second manual focus mode, the control unit moves the focus lens according to the angular position detected by the second sensor.

It is preferable that the camera body further comprises an imaging unit and a mode change-over switch. The imaging unit takes an image with light emitted from the lens barrel body. The mode change-over switch is used to select an auto-focus mode instead of the first manual focus mode and the second manual focus mode. It is preferable that the control unit obtains a focus position on the basis of an imaging signal obtained by the imaging unit and moves the focus lens to the focus position in a case in which the auto-focus mode is selected by the mode change-over switch.

It is preferable that the control unit moves the focus lens according to the rotational direction and the rotation angle after moving the focus lens to the focus position by the half press of a release switch in a case in which the auto-focus mode is selected by the mode change-over switch and the output of the third sensor represents that the switching-operation member is present at the rotation-allowable position.

It is preferable that the control unit moves the focus lens on the basis of the output of the second sensor to obtain the focus position in a case in which the auto-focus mode is selected by the mode change-over switch and the output of the third sensor represents that the switching-operation member is present at the rotation-restriction position.

The invention provides a method of controlling a camera body to which a lens barrel including a lens barrel body, a focus operation member, a rotation restricting member, a switching-operation member, a first sensor, a second sensor, and a third sensor is detachably connected. The method comprises: executing a first manual focus mode in which the focus lens is moved according to a rotational direction and a rotation angle obtained on the basis of the output of the first sensor in a case in which the output of the third sensor represents that the switching-operation member is present at a rotation-allowable position; and executing a second manual focus mode in which the focus lens is moved according to the angular position detected by the second sensor in a case in which the output of the third sensor represents that the switching-operation member is present at a rotation-restriction position. The lens barrel body houses an imaging optical system including a focus lens. The focus operation member is mounted on the lens barrel body so as to be endlessly rotatable about an optical axis of the imaging optical system. The rotation restricting member is rotatable about the optical axis within a limited angular range. The rotation restricting member is movable between an engagement position at which the rotation restricting member is engaged with the focus operation member and a disengagement position at which the rotation restricting member is not engaged with the focus operation member in a direction of the optical axis. The switching-operation member is mounted on the lens barrel body so as to be movable in the direction of the optical axis. The switching-operation member is movable between the rotation-restriction position at which the switching-operation member moves the rotation restricting member to the engagement position to restrict the rotation of the focus operation member within the angular range and the rotation-allowable position at which the switching-operation member moves the rotation restricting member to the disengagement position to allow the endless rotation of the focus operation member. The first sensor detects the rotation of the focus operation member. The second sensor detects the angular position of the rotation restricting member. The third sensor detects the position of the switching-operation member.

An imaging device of the invention comprises a lens barrel body, a focus operation member, a rotation restricting member, a switching-operation member, a first sensor, a second sensor, a third sensor, and a control unit. The lens barrel body houses an imaging optical system including a focus lens. The focus operation member is mounted on the lens barrel body so as to be endlessly rotatable about an optical axis of the imaging optical system. The rotation restricting member is rotatable about the optical axis within a limited angular range. The rotation restricting member is movable between an engagement position at which the rotation restricting member is engaged with the focus operation member and a disengagement position at which the rotation restricting member is not engaged with the focus operation member in a direction of the optical axis. The switching-operation member is mounted on the lens barrel body so as to be movable in the direction of the optical axis. The switching-operation member is movable between a rotation-restriction position at which the switching-operation member moves the rotation restricting member to the engagement position to restrict the rotation of the focus operation member within the angular range and a rotation-allowable position at which the switching-operation member moves the rotation restricting member to the disengagement position to allow the endless rotation of the focus operation member. The first sensor detects the rotation of the focus operation member. The second sensor detects the angular position of the rotation restricting member. The third sensor detects the position of the switching-operation member. The control unit executes a first manual focus mode in a case in which the output of the third sensor represents that the switching-operation member is present at the rotation-allowable position. In the first manual focus mode, the control unit moves the focus lens according to a rotational direction and a rotation angle obtained on the basis of the output of the first sensor. The control unit executes a second manual focus mode in a case in which the output of the third sensor represents that the switching-operation member is present at the rotation-restriction position. In the second manual focus mode, the control unit moves the focus lens according to the angular position detected by the second sensor.

It is preferable that the imaging device further comprises an imaging unit and a mode change-over switch. The imaging unit takes an image with light emitted from the lens barrel body. The mode change-over switch is used to select an auto-focus mode instead of the first manual focus mode and the second manual focus mode. It is preferable that the control unit obtains a focus position on the basis of an imaging signal obtained by the imaging unit and moves the focus lens to the focus position in a case in which the auto-focus mode is selected by the mode change-over switch.

It is preferable that the control unit moves the focus lens according to the rotational direction and the rotation angle after moving the focus lens to the focus position by the half press of a release switch in a case in which the auto-focus mode is selected by the mode change-over switch and the output of the third sensor represents that the switching-operation member is present at the rotation-allowable position.

It is preferable that the control unit moves the focus lens on the basis of the output of the second sensor to obtain the focus position in a case in which the auto-focus mode is selected by the mode change-over switch and the output of the third sensor represents that the switching-operation member is present at the rotation-restriction position.

The invention provides a method of controlling an imaging device comprising a lens barrel body, a focus operation member, a rotation restricting member, a switching-operation member, a first sensor, a second sensor, and a third sensor. The method comprises: executing a first manual focus mode in which the focus lens is moved according to a rotational direction and a rotation angle obtained on the basis of the output of the first sensor in a case in which the output of the third sensor represents that the switching-operation member is present at a rotation-allowable position; and executing a second manual focus mode in which the focus lens is moved according to the angular position detected by the second sensor in a case in which the output of the third sensor represents that the switching-operation member is present at a rotation-restriction position. The lens barrel body houses an imaging optical system including a focus lens. The focus operation member is mounted on the lens barrel body so as to be endlessly rotatable about an optical axis of the imaging optical system. The rotation restricting member is rotatable about the optical axis within a limited angular range. The rotation restricting member is movable between an engagement position at which the rotation restricting member is engaged with the focus operation member and a disengagement position at which the rotation restricting member is not engaged with the focus operation member in a direction of the optical axis. The switching-operation member is mounted on the lens barrel body so as to be movable in the direction of the optical axis. The switching-operation member is movable between the rotation-restriction position at which the switching-operation member moves the rotation restricting member to the engagement position to restrict the rotation of the focus operation member within the angular range and the rotation-allowable position at which the switching-operation member moves the rotation restricting member to the disengagement position to allow the endless rotation of the focus operation member. The first sensor detects the rotation of the focus operation member. The second sensor detects the angular position of the rotation restricting member. The third sensor detects the position of the switching-operation member.

According to the invention, since a manual focus mode is switched by the switching-operation member, it is possible to easily and reliably prevent an erroneous operation at the time of switching of the manual focus mode.

BRIEF DESCRIPTION OF THE DRAWINGS

FIG. 16 is a flow chart showing a procedure for moving a focus lens in the first MF mode.

FIG. 17 is a flow chart showing a procedure for moving the focus lens in the second MF mode.

DESCRIPTION OF THE PREFERRED EMBODIMENTS

Figure 1:
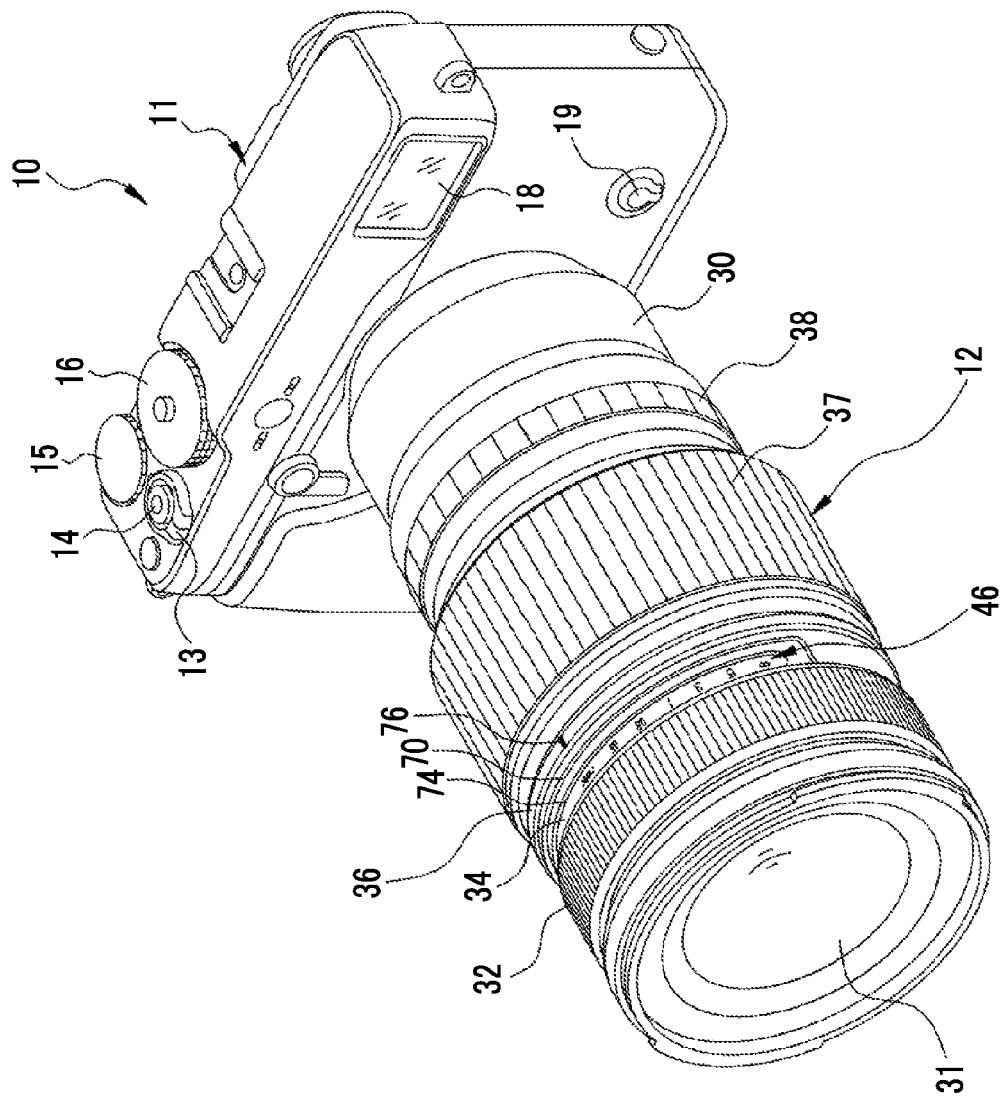
FIG. 1 is a perspective view of the front appearance of a lens-interchangeable digital camera.
Figure 2:
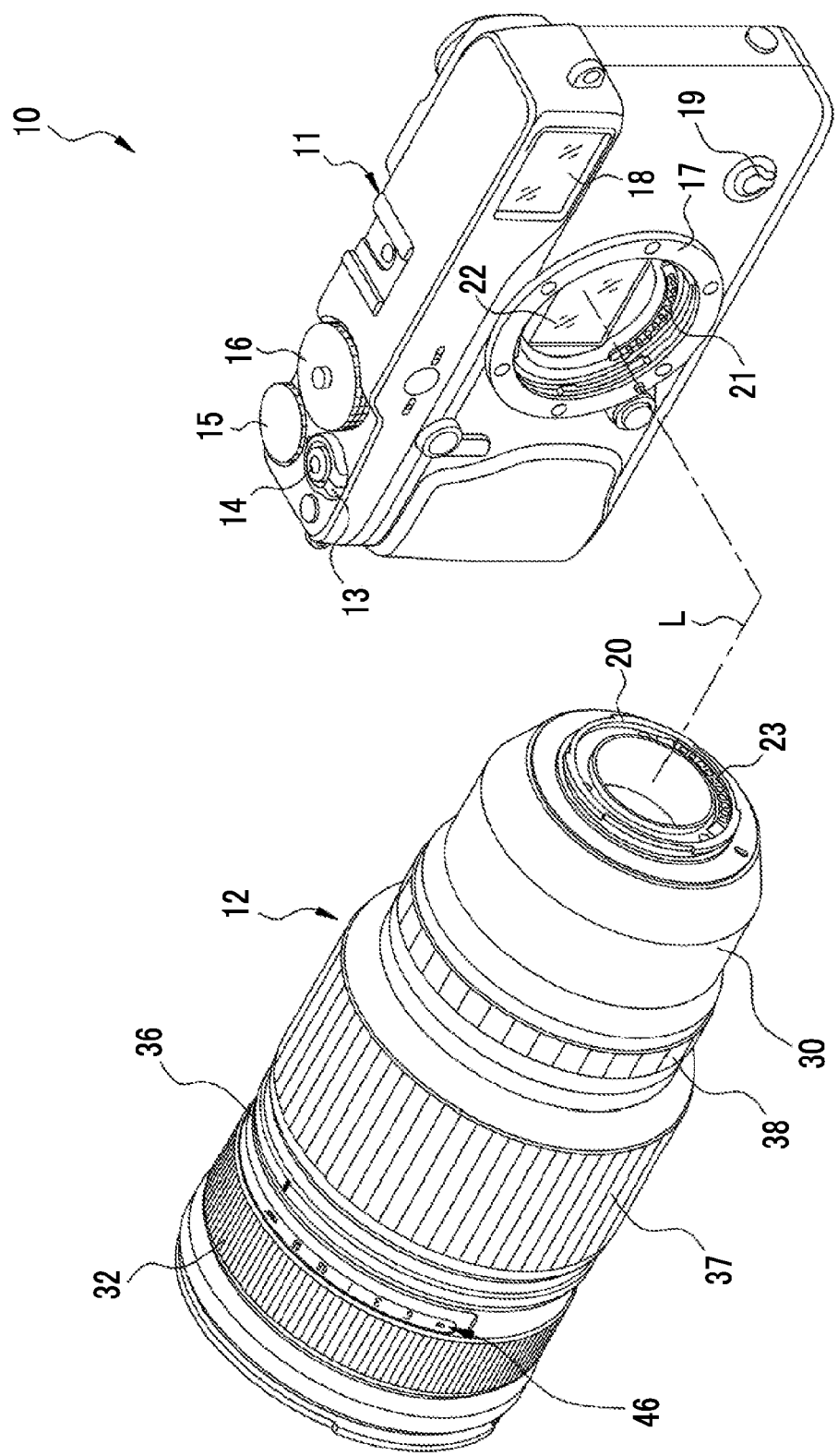
FIG. 2 is a perspective view of the appearance of a lens barrel and a camera body.

In FIGS. 1 and 2, a lens-interchangeable digital camera (hereinafter, referred to as a camera) 10 includes a camera body 11 and a lens barrel 12. The lens barrel 12 is detachably connected to the camera body 11. The camera 10 is a so-called mirrorless single-lens digital camera.

The camera body 11 includes a power lever 13, a release switch 14, an exposure correction dial 15, and a shutter speed dial 16 on the upper surface thereof. The release switch 14 is a so-called two-stage stroke type switch that allows "half press" and "full press". The release switch 14 outputs an S1-ON signal upon being half pressed, and outputs an S2-ON signal in the event that full press in which the release switch is further pressed from the half press is performed. In the event that the S1-ON signal is output from the release switch 14, the camera 10 performs imaging preparation processing, such as automatic focus adjustment (AF (Auto Focus) processing) or automatic exposure control. In the event that the S2-ON signal is output from the release switch 14, the camera 10 performs image processing.

Amount 17, an optical finder window 18, and a mode switching lever 19 are provided on the front surface of the camera body 11. The mount 17 is detachably coupled to a lens mount 20 provided at the rear end of the lens barrel 12 in the event that the lens barrel 12 is mounted on the camera body 11. Further, a body-side signal contact 21 and a solid-state imaging element 22 are provided in the mount 17. The body-side signal contact 21 electrically connects the lens barrel 12 to the camera body 11 by being electrically connected to lens-side signal contacts 23 provided at the rear end of the lens barrel 12 in a case in which the lens barrel 12 is mounted on the camera body 11. The solid-state imaging element 22 is an imaging unit that takes an image with light emitted from the lens barrel 12.

The mode switching lever 19 is a mode change-over switch that switches an imaging mode. In this embodiment, an imaging mode can be switched between a manual focus mode and an auto-focus mode by the mode switching lever 19.

Figure 3:
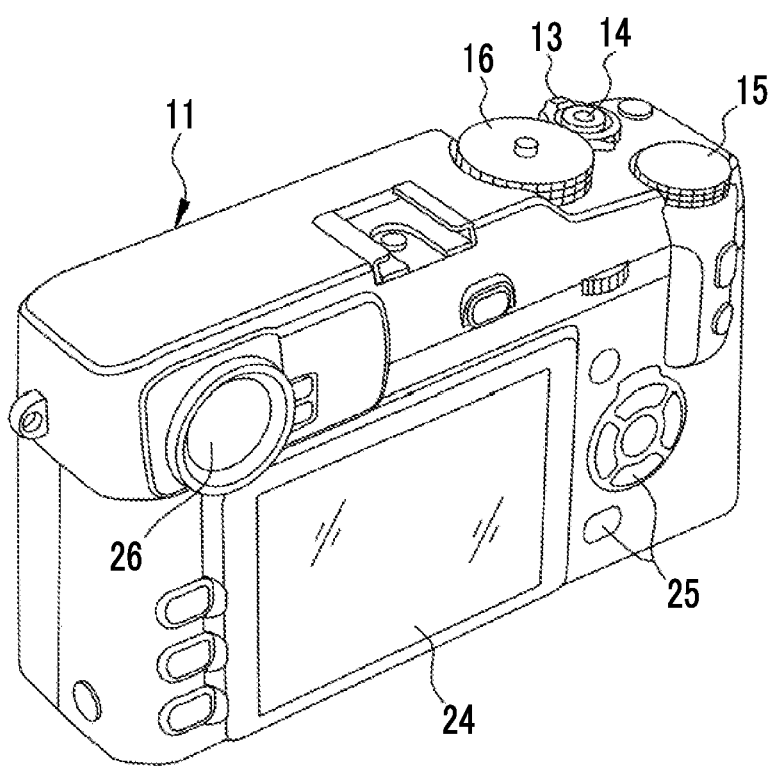
FIG. 3 is a perspective view of the back appearance of the camera body.

In FIG. 3, an image display unit 24, a plurality of operation buttons 25, a finder eyepiece 26, and the like are provided on the back surface of the camera body 11. The image display unit 24 is formed of, for example, a liquid crystal display (LCD) panel. The image display unit 24 is used to display a live view image, to play back and display a taken image, and the like. The operation buttons 25 are used for various setting operations, such as setting operations for switching the taking of a static image and the taking of a video. The finder eyepiece 26 can be switched to an optical finder and an electronic finder. The optical finder allows an optical image, which is obtained through the optical finder window 18, to be observed. The electronic finder allows a live view image, which is taken by the solid-state imaging element 22, to be observed. In a case in which the finder eyepiece 26 is switched to the electronic finder, a live view image, which is taken by the solid-state imaging element 22, is displayed on an electronic view finder (EVF) panel 27 (see FIG. 13) that is disposed behind the finder eyepiece 26. The EVF panel 27 is formed of a LCD or the like.

Figure 4:
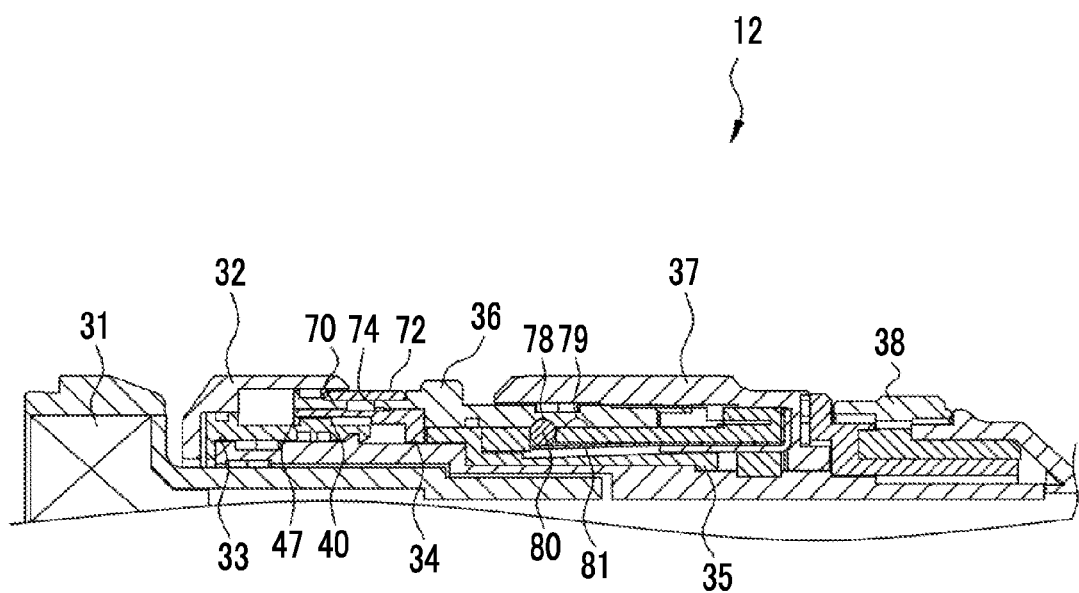
FIG. 4 is a cross-sectional view of the lens barrel.

In FIG. 4, the lens barrel 12 includes a lens barrel body 30, an imaging optical system 31, a focus operation ring 32, a first connection ring 33, a second connection ring 34, a cam ring 35, a switching-operation ring 36, a zoom operation ring 37, and a stop adjusting ring 38. The lens barrel body 30 has a cylindrical shape, and houses the imaging optical system 31 therein. The lens mount 20 is provided at the rear end of the lens barrel body 30 (see FIG. 2). In a case in which the lens barrel 12 is connected to the camera body 11, the imaging optical system 31 forms an image on the solid-state imaging element 22 with subject light.

The focus operation ring 32 is an operation member that is manually rotated by a user to adjust a focus. The focus operation ring 32 is mounted on the lens barrel body 30 so as to be endlessly rotatable about an optical axis L of the imaging optical system 31. An endlessly rotatable structure, which is mentioned here, is a structure in which the focus operation ring can be unlimitedly rotated without a fixed end in any rotational direction in the event that the focus operation ring is rotated with respect to the lens barrel body 30.

The first connection ring 33 is fixed to the focus operation ring 32 (see FIG. 4). The first connection ring 33 rotates together with the focus operation ring 32 in a case in which the focus operation ring 32 rotates. Accordingly, the focus operation ring 32 and the first connection ring 33 are integrated with each other and form a "focus operation member" of the invention.

Figure 5:
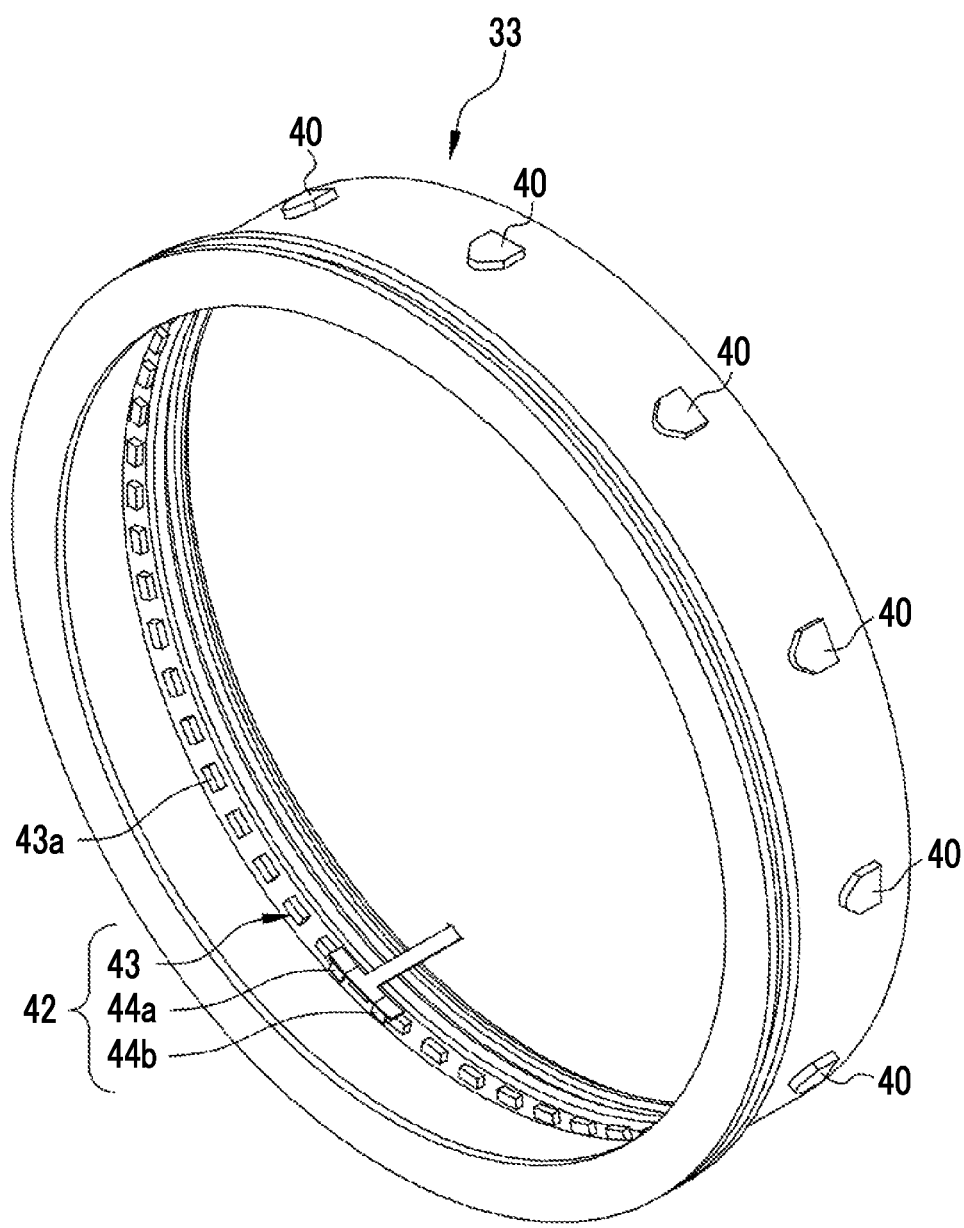
FIG. 5 is a perspective view of a first connection ring and a first sensor.

In FIG. 5, the first connection ring 33 includes first engagement protrusions 40 and a first sensor 42. The first engagement protrusions 40 are provided on the outer peripheral surface of the first connection ring 33 with a constant pitch in the circumferential direction of the first connection ring 33. Each of the first engagement protrusions 40 has, for example, a pentagonal shape, and is disposed so that the vertex of the first engagement protrusion 40 faces the front side.

The first sensor 42 includes a comb-tooth ring 43 and photo-interrupters 44a and 44b. The comb-tooth ring 43 includes a plurality of teeth 43a that are provided on the inner peripheral surface of the first connection ring 33. The teeth 43a are arranged with a constant pitch in the circumferential direction of the first connection ring 33. One tooth 43a of the comb-tooth ring 43 causes detection signals of the photo-interrupters 44a and 44b to change by blocking light that is incident on light-receiving elements of the photo-interrupters 44a and 44b.

The photo-interrupter 44a is an optical sensor that is provided at a position where a light emitting diode and a light-receiving element face each other. The photo-interrupter 44a inputs a detection signal, which is output from the light-receiving element, to a lens control unit 91 (see FIG. 13). Further, the photo-interrupter 44b has the same structure as the photo-interrupter 44a, and inputs a detection signal, which is output from the light-receiving element, to the lens control unit 91. In the lens control unit 91, the number of times of the blocking of light, which is incident on the light-receiving elements of the photo-interrupters 44a and 44b, performed by the teeth 43a is counted every fixed time period. The lens control unit 91 inputs this count value to a body control unit 100 (see FIG. 13), which is provided in the camera body 11, through the body-side signal contact 21 and the lens-side signal contacts 23.

Since the teeth 43a block light that is incident on the light-receiving elements of the photo-interrupters 44a and 44b in a case in which the focus operation ring 32 rotates, the detection signals of the photo-interrupters 44a and 44b are changed. The body control unit 100 detects the rotation of the focus operation ring 32 by detecting the rotation of the first connection ring 33 on the basis of the count value input from the lens control unit 91. In addition, the body control unit 100 obtains the rotation angle of the focus operation ring 32 on the basis of the count value input from the lens control unit 91 in a case in which the focus operation ring 32 rotates.

Figure 6:
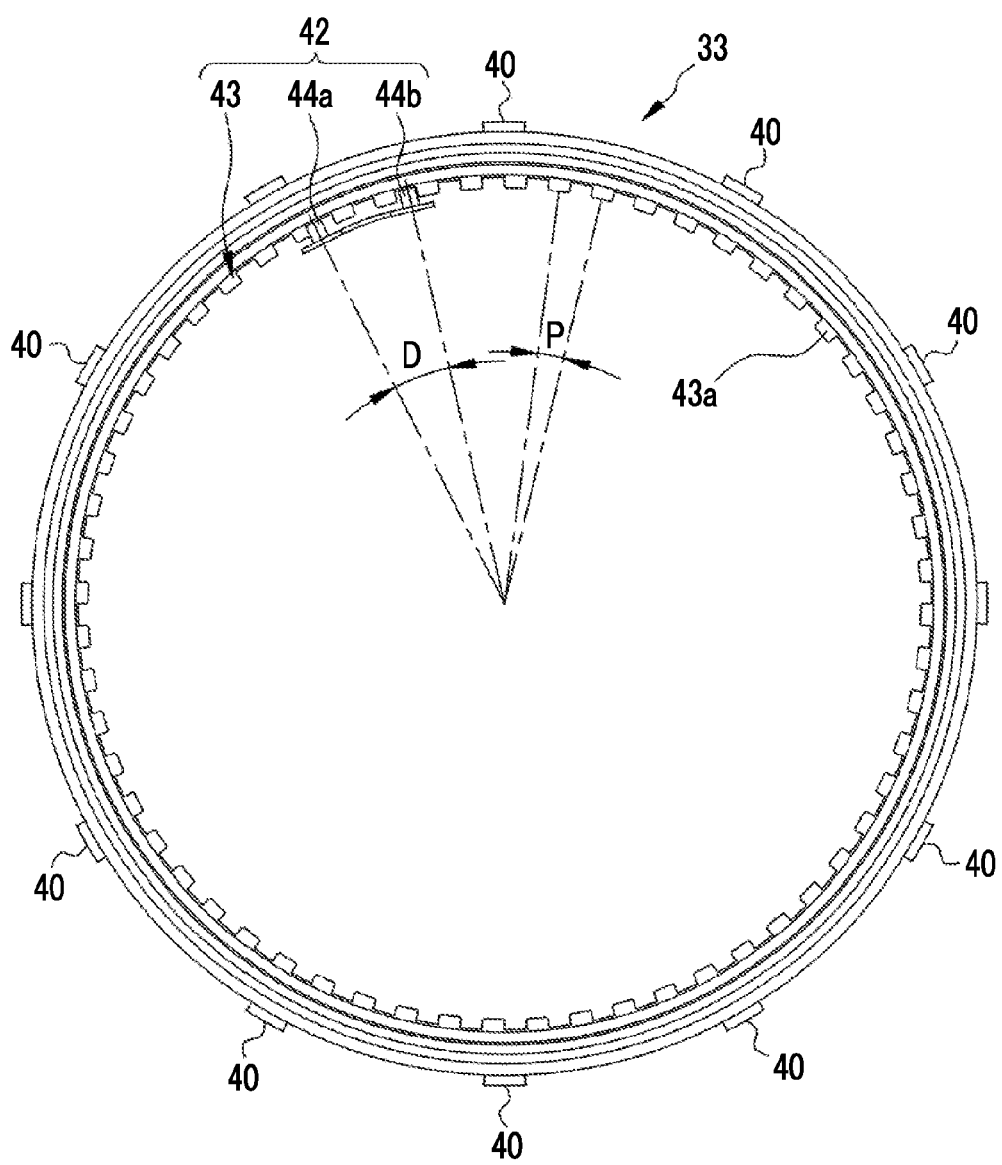
FIG. 6 is a front view of the first connection ring and the first sensor.

In FIG. 6, the photo-interrupters 44a and 44b are disposed so as to have phases, which are different from each other, with respect to the pitch P of the teeth 43a of the comb-tooth ring 43. Specifically, the photo-interrupters 44a and 44b are disposed at positions at which an interval D between the photo-interrupters 44a and 44b in the circumferential direction satisfies ($\frac{1}{4}$+N)×P (here, N is a positive integer). In this embodiment, N is set to 2. Accordingly, in the event that a time corresponding to a distance of "$\frac{1}{4}$×P" has passed after the teeth 43a block the light that is incident on the light-receiving element of the photo-interrupter 44a in a case in which the focus operation ring 32 is rotated to one side, any of the teeth 43a block the light that is incident on the light-receiving element of the photo-interrupter 44b. Further, in the event that a time corresponding to a distance of "$\frac{1}{4}$×P" has passed after the teeth 43a block the light that is incident on the light-receiving element of the photo-interrupter 44b in a case in which the focus operation ring 32 is rotated to the other side, any of the teeth 43a blocks the light that is incident on the light-receiving element of the photo-interrupter 44a. Accordingly, the rotational direction of the focus operation ring 32 can be obtained by the body control unit 100.

Figure 7:
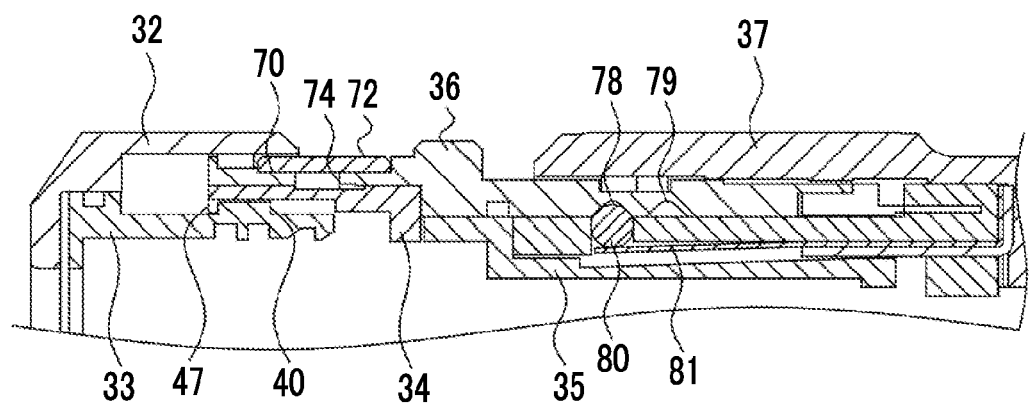
FIG. 7 is a cross-sectional view of a second connection ring that is present at an engagement position.
Figure 8:
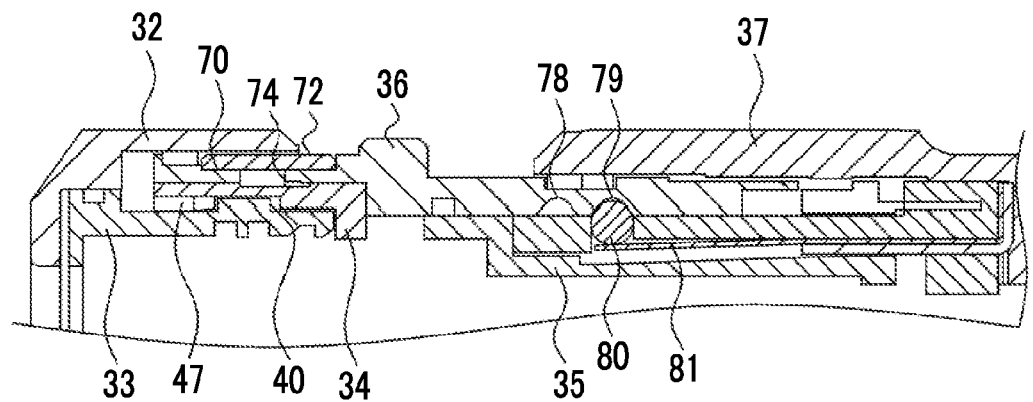
FIG. 8 is a cross-sectional view of the second connection ring that is present at a disengagement position.

In FIGS. 7 and 8, the second connection ring 34 is mounted on the switching-operation ring 36. The second connection ring 34 is rotatable about the optical axis L. In addition, the second connection ring 34 is movable between an engagement position at which the second connection ring 34 is engaged with the first connection ring 33 and a disengagement position at which the second connection ring 34 is not engaged with the first connection ring 33 in the direction of the optical axis L. FIG. 7 shows a case in which the second connection ring 34 is present at the engagement position. FIG. 8 shows a case in which the second connection ring 34 is present at the disengagement position. The second connection ring 34 is disposed closer to the inner diameter side of the lens barrel body 30 than the focus operation ring 32 and the switching-operation ring 36.

Figure 9:
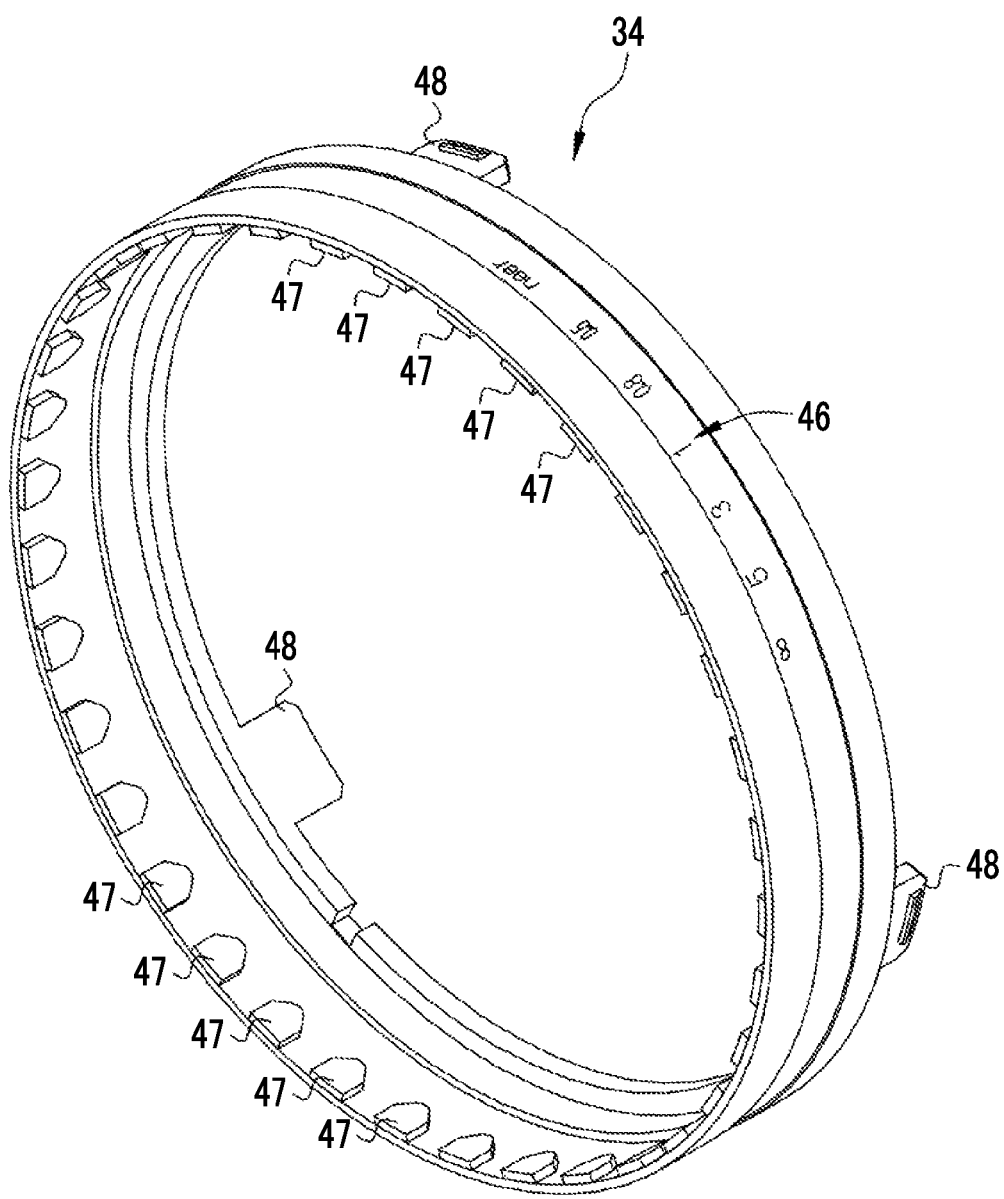
FIG. 9 is a perspective view of the second connection ring.

In FIG. 9, a distance scale 46 is provided on the outer peripheral surface of the second connection ring 34. Marks (letters, numerals, or symbols), which represent a distance, such as "near, 0.5, 0.8, 1, 3, 5, and ∞", are arranged on the distance scale 46 in the circumferential direction of the second connection ring 34. "Near" represents the shortest distance that allows an image to be taken. "∞" represents infinity. The other numerals represent an imaging distance of which the unit is meter. An imaging distance is a distance between the camera 10 and a subject on which the camera 10 focuses, and is linked with a focal distance.

The second connection ring 34 includes second engagement protrusions 47 and first fitting portions 48. The second engagement protrusions 47 are provided on the inner peripheral surface of the front portion of the second connection ring 34 with a constant pitch in the circumferential direction of the second connection ring 34. For example, the second engagement protrusions 47 are arranged with a pitch that is one third of the pitch of the first engagement protrusions 40. The shape of each second engagement protrusion 47 is, for example, a pentagonal shape, and is disposed so that the vertex of the second engagement protrusion 47 faces the rear side.

In a case in which the second connection ring 34 is present at the engagement position, the second engagement protrusions 47 are disposed between the first engagement protrusions 40 arranged in the circumferential direction. Specifically, since the second engagement protrusions 47 are arranged with a pitch that is one third of the pitch of the first engagement protrusions 40 of the first connection ring 33, three second engagement protrusions 47 are positioned between two first engagement protrusions 40. Accordingly, the second connection ring 34 is engaged with the first connection ring 33 in a case in which the second connection ring 34 is present at the engagement position. For this reason, in the event that the focus operation ring 32 rotates, the second connection ring 34 rotates through the first connection ring 33.

On the other hand, since the second engagement protrusions 47 are disposed in front of the first engagement protrusions 40 in a case in which the second connection ring 34 is present at the disengagement position, the second connection ring 34 is not engaged with the first connection ring 33. For this reason, in a case in which the second connection ring 34 is present at the disengagement position, the second connection ring 34 does not rotate even though the focus operation ring 32 rotates.

The first fitting portions 48 are formed in the shape of a protrusion that extends rearward from the rear end portion of the second connection ring 34 in parallel to the optical axis L. The first fitting portions 48 are provided at regular intervals of 120° in the circumferential direction of the second connection ring 34. The first fitting portions 48 are members that connect the second connection ring 34 to the cam ring 35.

The cam ring 35 is mounted on the lens barrel body 30 so as to be rotatable about the optical axis L within a limited angular range without moving in the direction of the optical axis L (see FIG. 4). The cam ring 35 is disposed closer to the inner diameter side of the lens barrel body 30 than the focus operation ring 32 and the switching-operation ring 36.

Figure 10:
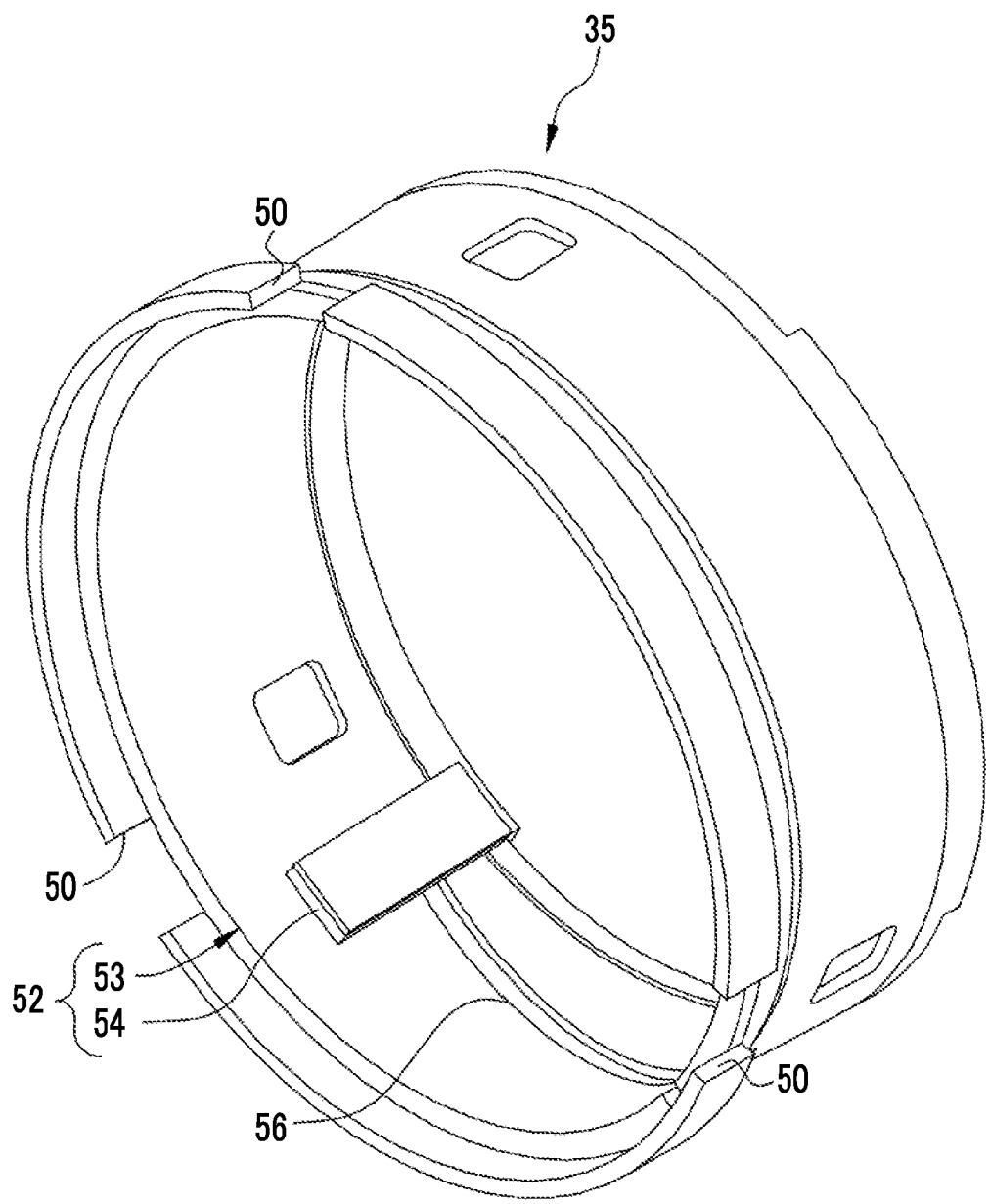
FIG. 10 is a perspective view of a cam ring and a second sensor.

In FIG. 10, the cam ring 35 includes second fitting portions 50 and a second sensor 52. The second fitting portions 50 are formed at the front end portion of the cam ring 35 in the shape of a recess, and are provided at positions facing the first fitting portions 48. For example, the second fitting portions 50 are provided at regular intervals of 120° at positions facing the first fitting portions 48. The second fitting portions 50 are fitted to the first fitting portions 48 even though the second connection ring 34 is present at any of the engagement position and the disengagement position. In a case in which the second connection ring 34 is present at the engagement position, the cam ring 35 rotates while being linked with the rotational motion of the second connection ring 34. On the other hand, in a case in which the second connection ring 34 is present at the disengagement position, the cam ring 35 does not rotate.

The second sensor 52 includes a cam barrel 53 and a position sensor 54. The cam barrel 53 is formed in a cylindrical shape and includes a cam groove 56. The cam groove 56 is cut along a direction inclined with respect to the circumferential direction around the optical axis L.

Figure 11:
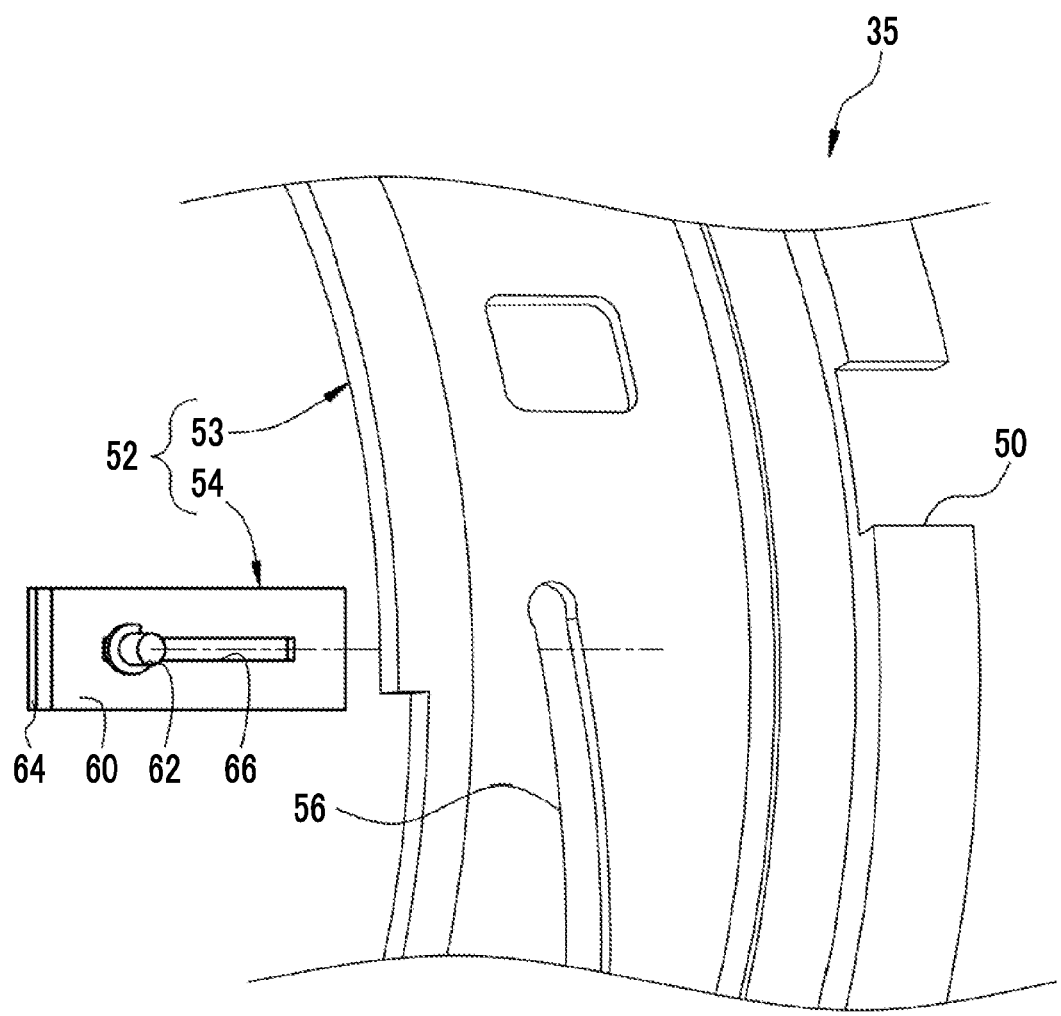
FIG. 11 is a perspective view of the cam ring and the second sensor that are seen from the back side.

In FIG. 11, the position sensor 54 includes a fixed frame 60, a cam pin 62, and a resistor substrate 64. The fixed frame 60 supports the cam pin 62 and the resistor substrate 64, and is fixed to the lens barrel body 30. A guide groove 66, which extends parallel to the optical axis L, is formed in the fixed frame 60 at a position facing the resistor substrate 64.

The cam pin 62 is engaged with the cam groove 56 and is inserted into the guide groove 66. In the event that the cam ring 35 rotates, the cam pin 62 linearly moves in the direction of the optical axis L within the range of the guide groove 66. As described above, the cam pin 62 forms a conversion mechanism, which converts the rotational motion of the cam ring 35 into a linear movement, together with the guide groove 66 and the cam barrel 53.

The rotational motion of the cam ring 35 is linked with the rotational motion of the second connection ring 34. In a case in which the second connection ring 34 is present at the engagement position, the second connection ring 34 is rotatable about the optical axis L within an angular range limited by the cam ring 35. Accordingly, since the first connection ring 33, the second connection ring 34, and the cam ring 35 are connected to each other in a case in which the second connection ring 34 is present at the engagement position, the focus operation ring 32 is rotatable about the optical axis L within a limited angular range. As described above, the second connection ring 34 and the cam ring 35 form a "rotation restricting member" of the invention.

The resistor substrate 64 comes into contact with the cam pin 62, and forms a variable resistor of which the resistance value changes according to the linear movement of the cam pin 62. The resistor substrate 64 detects the angular position of the cam ring 35 on the basis of a change in a resistance value. The resistor substrate 64 output a detection signal, which represents a change in a resistance value, to the body control unit 100 through the lens control unit 91. The body control unit 100 obtains the angular position of the cam ring 35, that is, the angular position of the focus operation ring 32 on the basis of the detection signal that is input from the lens control unit 91.

The switching-operation ring 36 is mounted on the lens barrel body 30 so as to be movable in the direction of the optical axis L (see FIGS. 7 and 8). As the switching-operation ring 36 is moved in the direction of the optical axis L, the switching-operation ring 36 moves the second connection ring 34 to the engagement position or the disengagement position. The switching-operation ring 36 is a switching-operation member that is switched between a "rotation-restriction position" at which the switching-operation ring 36 moves the second connection ring 34 to the engagement position to restrict the rotation of the focus operation ring 32 within the angular range and a "rotation-allowable position" at which the switching-operation ring 36 moves the second connection ring 34 to the disengagement position to allow the endless rotation of the focus operation ring 32. The switching-operation ring 36, which is present at the rotation-allowable position, is closer to the focus operation ring 32 than the switching-operation ring 36 that is present at the rotation-restriction position.

Figure 12:
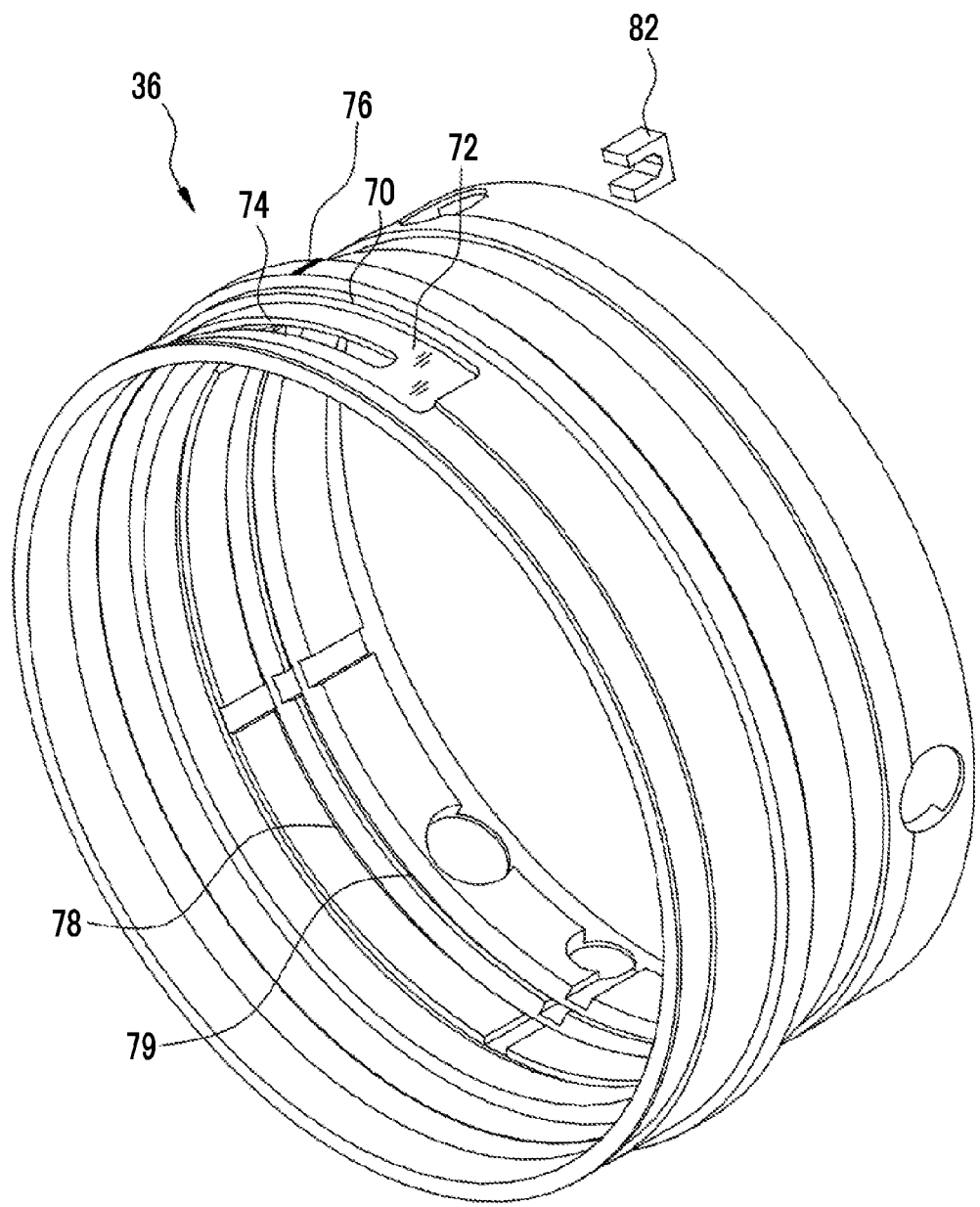
FIG. 12 is a perspective view of a switching-operation ring and a third sensor.

In FIG. 12, a recessed portion 70 that is lowered from the outer peripheral surface of the switching-operation ring 36 by one stage and a transparent cover 72 that covers the recessed portion 70 are provided on the outer peripheral surface of the switching-operation ring 36. An exposure hole 74 through which the distance scale 46 provided on the second connection ring 34 is exposed to the outside is formed at the bottom portion of the recessed portion 70. In a case in which the switching-operation ring 36 is present at the rotation-restriction position, the exposure hole 74 is not covered with the focus operation ring 32 as shown in FIG. 7 and the distance scale 46 is exposed to the outside. On the other hand, in a case in which the switching-operation ring 36 is present at the rotation-allowable position, the exposure hole 74 is covered with the focus operation ring 32 as shown in FIG. 8 and the distance scale 46 is not exposed to the outside.

Further, an index 76, which is a linear mark, is provided near the exposure hole 74 on the outer peripheral surface of the switching-operation ring 36. The index 76 is set to a desired imaging distance of the distance scale 46 by the operation of the focus operation ring 32 in a case in which the switching-operation ring 36 is present at the rotation-restriction position.

A front groove 78 is provided at the front portion of the inner peripheral surface of the switching-operation ring 36, and a rear groove 79 is provided at the rear portion thereof. The front and rear grooves 78 and 79 extend in the circumferential direction of the switching-operation ring 36. In the event that the switching-operation ring 36 is mounted on the lens barrel body 30, a ball 80 is housed in the front and rear grooves 78 and 79. In a case in which the switching-operation ring 36 is present at the rotation-restriction position, the ball 80 is housed in the front groove 78 (see FIG. 7). In a case in which the switching-operation ring 36 is present at the rotation-allowable position, the ball 80 is housed in the rear groove 79 (see FIG. 8). The ball 80 is pushed toward the inner peripheral surface of the switching-operation ring 36 by a leaf spring 81 fixed to the lens barrel body 30. The leaf spring 81 is an elastic member that biases the ball 80 and is bent in a direction perpendicular to the optical axis L.

While the switching-operation ring 36 is moved to the rotation-allowable position from the rotation-restriction position, the ball 80 is moved to the inner diameter side along the inclination of the front groove 78 and pushes the leaf spring 81 back. Accordingly, in the event that the leaf spring 81 is bent toward the inner diameter side, the ball 80 goes out of the front groove 78. Then, in the event that the switching-operation ring 36 is moved to the rotation-allowable position, the ball 80 is put in the rear groove 79 and is pushed against the leaf spring 81. In the event that the switching-operation ring 36 is moved to the rotation-restriction position from the rotation-allowable position, likewise, the ball 80 also pushes the leaf spring 81 back and goes out of the rear groove 79. In the event that the switching-operation ring 36 is moved to the rotation-restriction position, the ball 80 is put in the front groove 78 and is pushed against the leaf spring 81. In this way, the switching-operation ring 36 can be switched between the rotation-allowable position and the rotation-restriction position.

The position of the switching-operation ring 36 is detected by a third sensor 82 (see FIG. 12). The third sensor 82 is fixed to the lens barrel body 30 on the rear side of the switching-operation ring 36. The third sensor 82 is an optical sensor of which a light emitting diode and a light-receiving element are provided at positions facing each other. In a case in which the switching-operation ring 36 is present at the rotation-restriction position, light emitted from the light emitting diode is blocked by the rear end portion of the switching-operation ring 36. On the other hand, in a case in which the switching-operation ring 36 is present at the rotation-allowable position, light emitted from the light emitting diode is incident on the light-receiving element without being blocked. The detection signal of the light-receiving element is output to the body control unit 100 (see FIG. 13) through the lens control unit 91. The body control unit 100 obtains the position of the switching-operation ring 36 on the basis of the detection signal that is input from the lens control unit 91.

Figure 13:
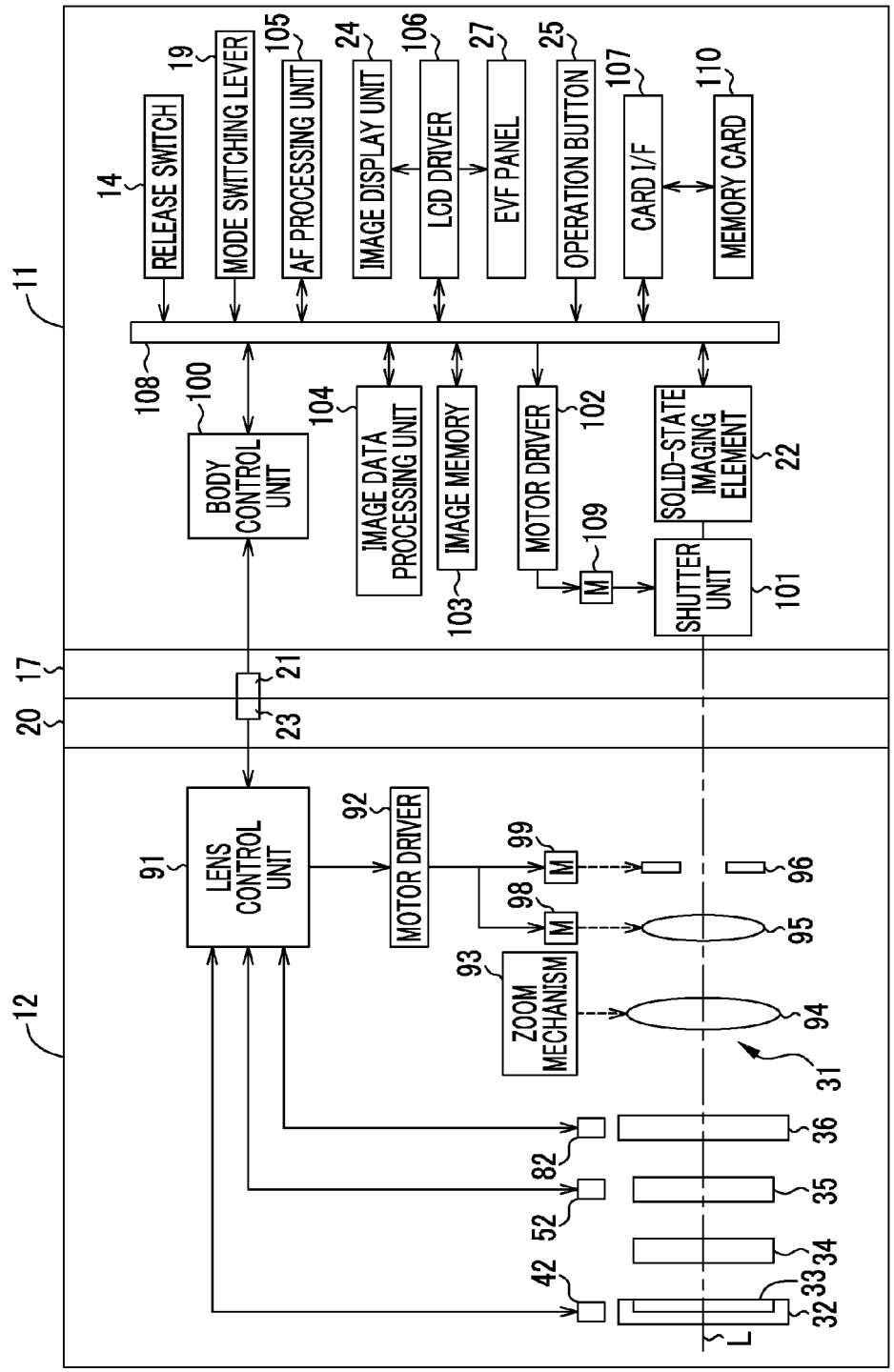
FIG. 13 is a block diagram showing the configuration of the lens-interchangeable digital camera.

As shown in FIG. 13, the lens barrel 12 includes the lens control unit 91, a motor driver 92, and a zoom mechanism 93 in addition to the imaging optical system 31, the focus operation ring 32, the first connection ring 33, the second connection ring 34, the cam ring 35, the switching-operation ring 36, the first sensor 42, the second sensor 52, and the third sensor 82 that have been described above.

The lens control unit 91 is formed of a microcomputer that includes a central processing unit (CPU), a read only memory (ROM) storing programs and parameters used in the CPU, and a random access memory (RAM) used as a work memory of the CPU (all of them are not shown), and the like; and controls the respective parts of the lens barrel 12. The motor driver 92 is connected to the lens control unit 91.

The imaging optical system 31 includes: a plurality of lenses that include a variable magnification lens 94 and a focus lens 95; a stop unit 96; and the like. The zoom mechanism 93 is a manual zoom mechanism, and moves the variable magnification lens 94 by converting the rotational motion of the zoom operation ring 37 to a linear movement. The variable magnification lens 94 is moved in the direction of the optical axis L by the driving of the zoom mechanism 93, and changes the angle of view.

The focus lens 95 is moved in the direction of the optical axis L by the driving of a motor 98, and adjusts an imaging distance. The stop unit 96 moves a plurality of stop blades (not shown) by the driving of a motor 99 and changes the amount of incident light to be incident on the solid-state imaging element 22. The motors 98 and 99 are stepping motors or servomotors. The motor driver 92 controls the driving of the motors 98 and 99 on the basis of the control of the lens control unit 91. In this embodiment, the motor 98 and the motor driver 92 forma drive unit that moves the focus lens 95 in the direction of the optical axis L.

The lens-side signal contacts 23 are a plurality of contacts that are used to send and receive electrical signals between the lens barrel 12 and the camera body 11. The lens-side signal contacts 23 include a contact that is used to send signals to the lens control unit 91 from the camera body 11, a contact that is used to send signals to the camera body 11 from the lens control unit 91, a contact (not shown) that is used to receive power supplied from the camera body 11 and is used to supply power to the respective parts of the lens barrel 12, and the like.

Further, the lens barrel 12 is provided with sensors (not shown) that detect the angular position or the rotational direction and the rotation angle of the stop adjusting ring 38, and these sensors send detection signals to the camera body 11 as in the cases of the first, second, and third sensors 42, 52, and 82.

The camera body 11 includes the body control unit 100 (control unit), a shutter unit 101, a motor driver 102, an image memory 103, an image data processing unit 104, an AF processing unit 105, a LCD driver 106, and a card I/F (interface) 107 in addition to the release switch 14, the mode switching lever 19, the solid-state imaging element 22, the image display unit 24, the operation buttons 25, and the EVF panel 27 that have been described above. These parts are connected to each other through a busline 108.

The body control unit 100 includes a CPU, a ROM that stores programs and parameters used in the CPU, a RAM that is used as a work memory of the CPU, and the like. The body control unit 100 controls the camera body 11 and the respective parts of the lens barrel 12 that is connected to the camera body 11. The S1-ON signal and the S2-ON signal are input to the body control unit 100 from the release switch 14. Further, the body-side signal contact 21 is connected to the body control unit 100.

Furthermore, the body control unit 100 operates the stop unit 96 according to the output of a sensor that detects the rotation of the stop adjusting ring 38 and sends a control signal, which allows a stop diameter to change, to the lens control unit 91. The lens control unit 91 controls the motor driver 92 on the basis of the control signal, and changes the stop diameter.

The shutter unit 101 is a so-called focal-plane shutter, and is disposed between the mount 17 and the solid-state imaging element 22. The shutter unit 101 is provided so as to be capable of blocking a light path between the imaging optical system 31 and the solid-state imaging element 22, and can take an open state and a closed state. The shutter unit 101 is in an open state while a live view image and a video are taken, and is temporarily in a closed state while a static image is taken. The shutter unit 101 is driven by a shutter motor 109. The motor driver 102 controls the driving of the shutter motor 109.

The driving of the solid-state imaging element 22 is controlled by the body control unit 100. For example, the solid-state imaging element 22 is a single-plate color imaging CMOS (Complementary Metal-Oxide Semiconductor) image sensor including an R(Red)G(Green)B(Blue) color filter. The solid-state imaging element 22 includes a light-receiving surface that is formed of a plurality of pixels (not shown) arranged in the form of a two-dimensional matrix. Each of the pixels includes a photoelectric conversion element, and generates an imaging signal by photoelectrically converting the image of a subject that is formed on the light-receiving surface by the lens barrel 12.

Further, the solid-state imaging element 22 includes a noise rejection circuit, an automatic gain controller, and a signal processing circuit, such as an A/D (Analog to Digital) conversion circuit (all of them are not shown). The noise rejection circuit performs noise rejection processing on an imaging signal. The automatic gain controller amplifies the level of an imaging signal to an optimum value. The A/D conversion circuit converts an imaging signal into a digital signal and outputs the digital signal to the busline 108 from the solid-state imaging element 22. An output signal of the solid-state imaging element 22 is image data that has one color signal for each pixel.

The image memory 103 stores image data corresponding to one frame that is output to the busline 108. The image data processing unit 104 reads the image data, which corresponds to one frame, from the image memory 103, and performs publicly known image processing, such as a matrix operation, demosaicing, γ-correction, brightness/color difference conversion, and resize processing. The AF processing unit 105 calculates an AF evaluation value, which is an integrated value of high-frequency components, from the image data corresponding to one frame. The AF evaluation value corresponds to the contrast of an image.

The LCD driver 106 sequentially inputs the image data, which corresponds to one frame and has been subjected to image processing by the image data processing unit 104, to the image display unit 24 or the EVF panel 27. The image display unit 24 and the EVF panel 27 sequentially display a live view image at a predetermined period. The card I/F 107 is built in a card slot (not shown) provided in the camera body 11, and is electrically connected to a memory card 110 inserted into the card slot. The card I/F 107 stores the image data, which has been subjected to image processing by the image data processing unit 104, in the memory card 110. Further, for the image data stored in the memory card 110 to be played back and displayed, the card I/F 107 reads the image data from the memory card 110.

The body control unit 100 sends a control signal, which allows the focus lens 95 to move on the basis of the outputs of the first sensor 42, the second sensor 52, and the third sensor 82, to the lens control unit 91 according to an imaging mode. The lens control unit 91 controls the motor driver 92 on the basis of the control signal and moves the focus lens 95.

The body control unit 100 selectively executes a manual focus mode (MF mode) and an auto-focus mode (AF mode) on the basis of the mode switching lever 19. A first MF mode (first manual focus mode) and a second MF mode (second manual focus mode) are provided as the MF mode. In the first MF mode, an imaging distance is changed according to the rotation of the focus operation ring 32 that is performed by a user. In the second MF mode, an imaging distance corresponding to the distance scale 46 set to the position of the index 76 is set.

An S-AF (Single-AF) mode at the time of the taking of a static image and a C-AF (Continuous-AF) mode at the time of the taking of a video are provided as the AF mode. The S-AF includes a first AF mode, a second AF mode, and a third AF mode. In the first AF mode, AF is performed by the body control unit 100. In the second AF mode, a focus can be adjusted from a focus position, which is set by AF, according to the operation of the focus operation ring 32 that is performed by a user. In the third AF mode, AF is performed within a specific distance range including the imaging distance, which corresponds to the distance scale 46 set to the position of the index 76, as a middle. The first AF mode and the second AF mode can be selectively executed by the operation buttons 25 that are provided on the back surface of the camera body 11.

The C-AF mode includes a fourth AF mode and a fifth AF mode. In the fourth AF mode, AF is repeatedly performed while a video is taken. In the fifth AF mode, the same processing as the processing of the third AF mode is repeatedly performed while a video is taken.

The operation of the body control unit 100 will be described below with reference to FIGS. 14 to 22.

Figure 14:
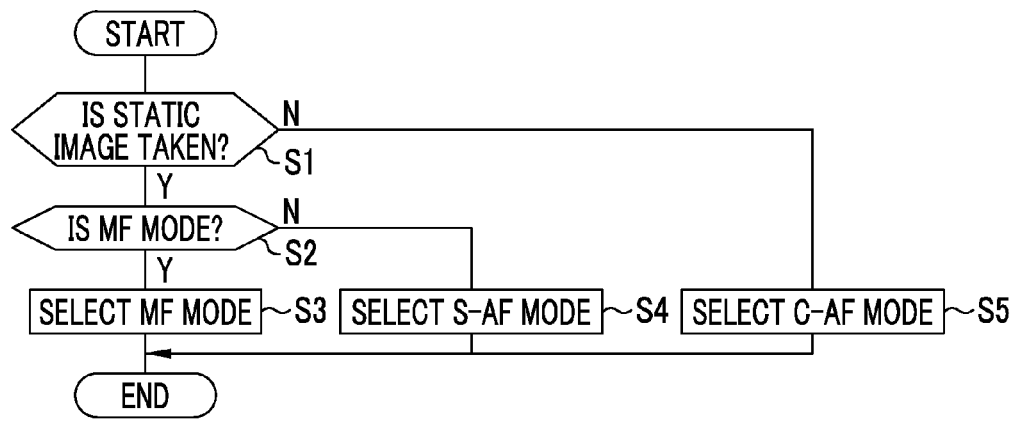
FIG. 14 is a flow chart showing execution conditions of an MF mode, an S-AF mode, and a C-AF mode.

As shown in FIG. 14, the body control unit 100 detects which of the taking of a static image and the taking of a video is selected (S1). Assuming that the taking of a static image is selected (YES in S1), the body control unit 100 detects which mode of the MF mode and the AF mode the set position of the mode switching lever 19 is set to (S2). Assuming that the mode switching lever 19 is present at the set position corresponding to the MF mode (YES in S2), the body control unit 100 selects the MF mode. Assuming that the mode switching lever 19 is present at the set position corresponding to the AF mode (NO in S2), the body control unit 100 selects the S-AF mode (S3). On the other hand, assuming that the taking of a video is selected (NO in S1), the body control unit 100 selects the C-AF mode (S4).

Figure 15:
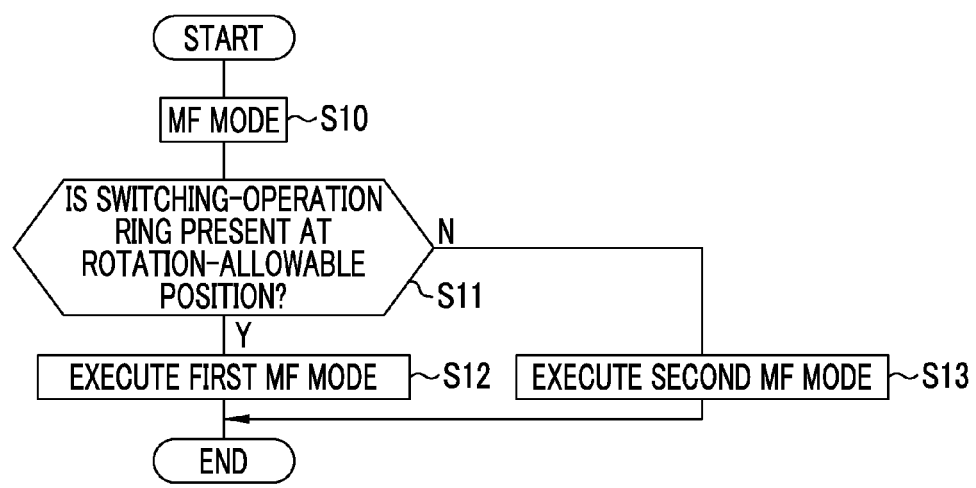
FIG. 15 is a flow chart showing execution conditions of a first MF mode and a second MF mode.

In a case in which the body control unit 100 selects the MF mode as shown in FIG. 15 (S10), the body control unit 100 determines whether or not the output of the third sensor 82 represents that the switching-operation ring 36 is present at the rotation-allowable position (S11). Assuming that the output of the third sensor 82 represents that the switching-operation ring 36 is present at the rotation-allowable position (YES in S11), the body control unit 100 executes the first MF mode (S12). Further, assuming that the output of the third sensor 82 represents that the switching-operation ring 36 is present at the rotation-restriction position (NO in S11), the body control unit 100 executes the second MF mode (S13).

In a case in which the first MF mode is executed as shown in FIG. 16 (S20), the body control unit 100 detects the rotation of the focus operation ring 32 on the basis of the detection signal of the first sensor 42 (S21) and moves the focus lens 95 in the direction of the optical axis L according to the rotational direction and the rotation angle of the focus operation ring 32 (S22). The body control unit 100 determines whether or not the focus lens 95 reaches the position corresponding to the rotational direction and the rotation angle of the focus operation ring 32 (S23). The movement of the focus lens 95 is continued (S22) until the focus lens 95 reaches the position corresponding to the rotational direction and the rotation angle of the focus operation ring 32 (NO in S23). Assuming that the focus lens 95 reaches the position corresponding to the rotational direction and the rotation angle of the focus operation ring 32 (YES in S23), the body control unit 100 stops the movement of the focus lens 95 (S24). In this way, an imaging distance can be finely adjusted by a user in the first MF mode.

The body control unit 100 obtains the rotational speed of the focus operation ring 32 on the basis of the rotation angle of the focus operation ring 32 obtained per predetermined time, and changes the moving distance of the focus lens 95 according to the rotational speed. That is, the body control unit 100 performs control for reducing the moving distance of the focus lens 95 in a case in which the rotational speed is low, and performs control for increasing the moving distance of the focus lens 95 in a case in which the rotational speed is high.

In a case in which the second MF mode is executed as shown in FIG. 17 (S30), the body control unit 100 calculates the position of the focus lens 95 at which the imaging distance corresponding to the distance scale 46 set to the position of the index 76 is obtained (S31) on the basis of the detection signal of the second sensor 52. The body control unit 100 moves the focus lens 95 to the calculated position (S32) and stops the movement of the focus lens 95 (S33). In this way, so-called focusing imaging in which a user performs imaging after determining an imaging distance in advance by visual estimation or the like can be performed in the second MF mode.

Figure 18:
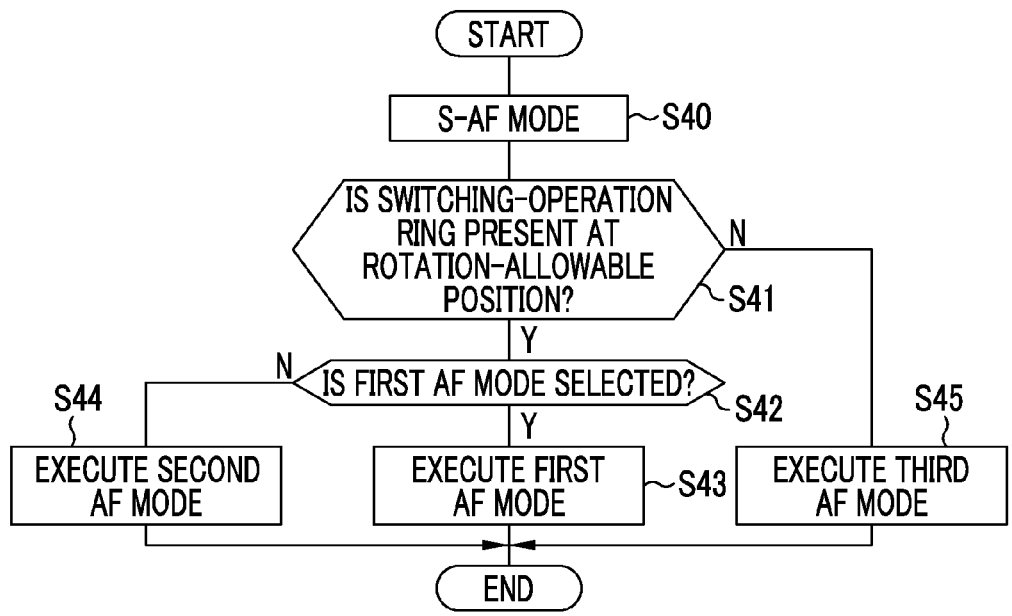
FIG. 18 is a flow chart showing execution conditions of a first AF mode, a second AF mode, and a third AF mode in the S-AF mode.

Further, in a case in which the body control unit 100 selects the S-AF mode as shown in FIG. 18 (S40), the body control unit 100 determines whether or not the output of the third sensor 82 represents that the switching-operation ring 36 is present at the rotation-allowable position (S41). Assuming that the output of the third sensor 82 represents that the switching-operation ring 36 is present at the rotation-allowable position (YES in S41), the body control unit 100 determines whether or not the first AF mode is selected by the operation buttons 25 (S42). Assuming that the first AF mode is selected (YES in S42), the body control unit 100 executes the first AF mode (S43). Further, assuming that the second AF mode is selected (No in S42), the body control unit 100 executes the second AF mode (S44). On the other hand, assuming that the output of the third sensor 82 represents that the switching-operation ring 36 is present at the rotation-restriction position (NO in S41), the body control unit 100 executes the third AF mode (S45).

Figure 19:
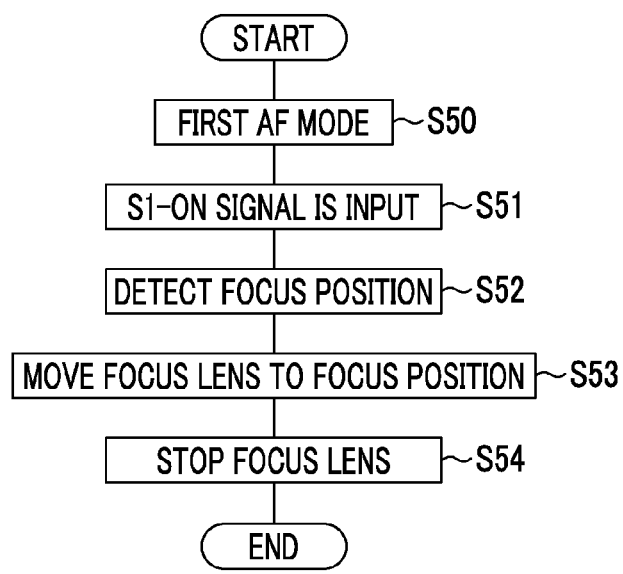
FIG. 19 is a flow chart showing a procedure for moving the focus lens in the first AF mode.

In the event that an S1-ON signal is input to the body control unit 100 by the half press of the release switch 14 (S51) in a case in which the body control unit 100 executes the first AF mode as shown in FIG. 19 (S50), the body control unit 100 detects the position of the focus lens 95 (focus position) at which the AF evaluation value becomes the maximum value (S52) on the basis of the AF evaluation value that is calculated by the AF processing unit 105 whenever image data corresponding to one frame is obtained. The body control unit 100 moves the focus lens 95 to the detected focus position (S53), and stops the movement of the focus lens 95 (S54). In this way, a focus is automatically adjusted without a user's operation in the first AF mode.

Figure 20:
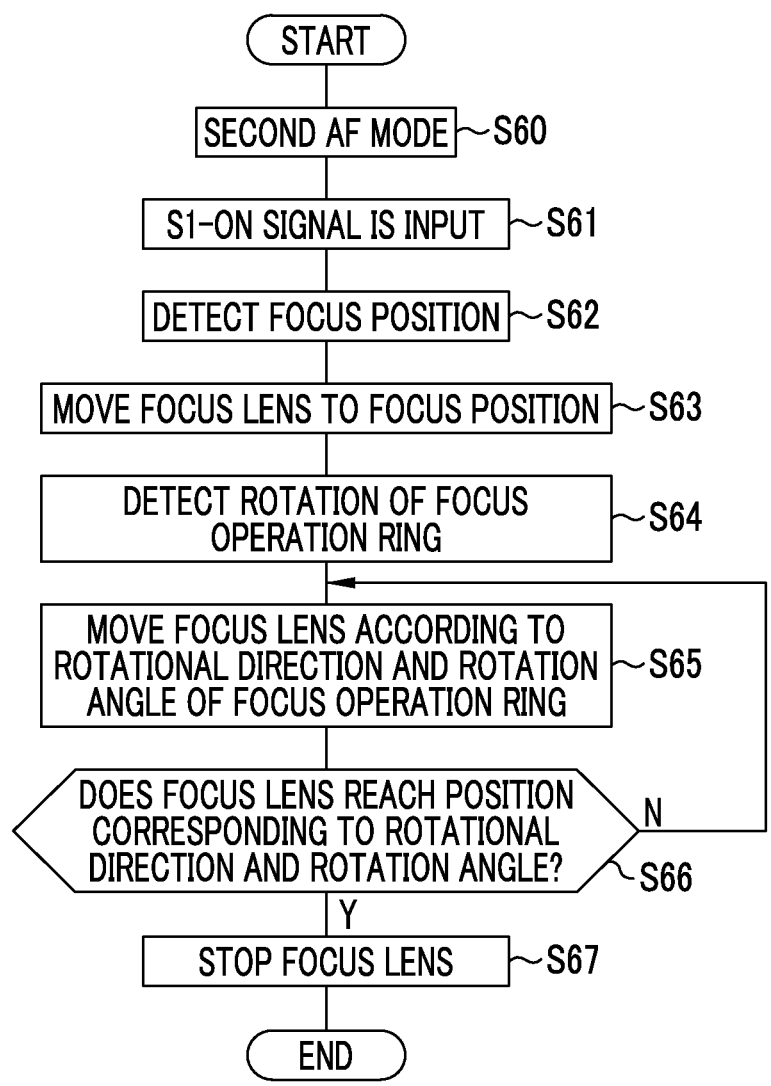
FIG. 20 is a flow chart showing a procedure for moving the focus lens in the second AF mode.

In the event that an S1-ON signal is input to the body control unit 100 by the half press of the release switch 14 (S61) in a case in which the body control unit 100 executes the second AF mode as shown in FIG. 20 (S60), the body control unit 100 detects the focus position on the basis of the AF evaluation value (S62) and moves the focus lens 95 to this focus position (S63).

In addition, in the second AF mode, the body control unit 100 detects the rotation of the focus operation ring 32 on the basis of the detection signal of the first sensor 42 (S64) and moves the focus lens 95 from the focus position according to the rotational direction and the rotation angle of the focus operation ring 32 (S65). Then, the body control unit 100 determines whether or not the focus lens 95 reaches the position corresponding to the rotational direction and the rotation angle of the focus operation ring 32 (S66). The movement of the focus lens 95 is continued (S65) until the focus lens 95 reaches the position corresponding to the rotational direction and the rotation angle of the focus operation ring 32 (NO in S66). Assuming that the focus lens 95 reaches the position corresponding to the rotational direction and the rotation angle of the focus operation ring 32 (YES in S66), the body control unit 100 stops the movement of the focus lens 95 (S67). In this way, a user can finely adjust an imaging distance from the focus position, which is set by AF, in the second AF mode.

Figure 21:
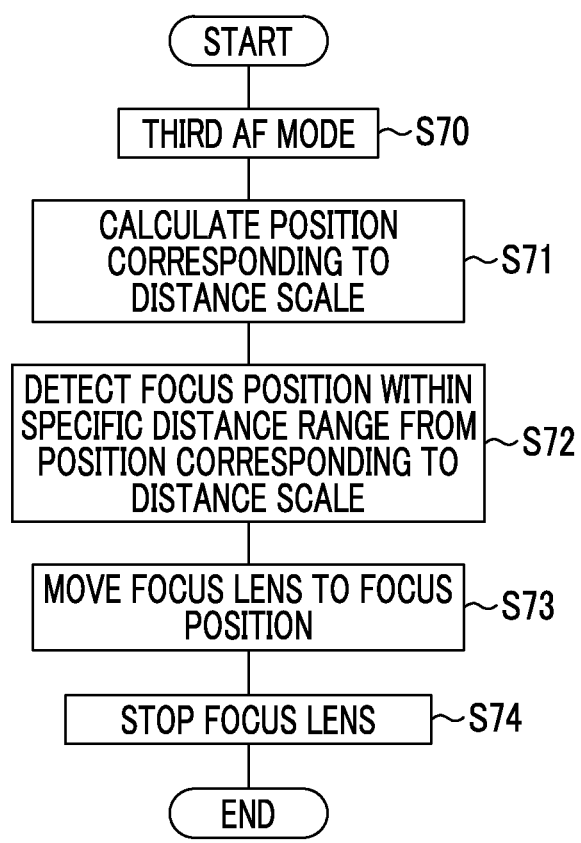
FIG. 21 is a flow chart showing a procedure for moving the focus lens in the third AF mode.

In a case in which the body control unit 100 executes the third AF mode as shown in FIG. 21 (S70), the body control unit 100 calculates the position of the focus lens 95, at which the imaging distance corresponding to the distance scale 46 set to the position of the index 76 is obtained, on the basis of the detection signal of the second sensor 52 (S71). Then, the body control unit 100 detects the focus position within a specific distance range that includes the calculated position as a middle (S72). The body control unit 100 moves the focus lens 95 to the detected focus position (S73) and stops the movement of the focus lens 95 (S74). In this way, AF is performed only within a specific distance range, which is designated by a user, by the focus operation ring 32 in the third AF mode. Accordingly, AF is quickly performed.

Figure 22:
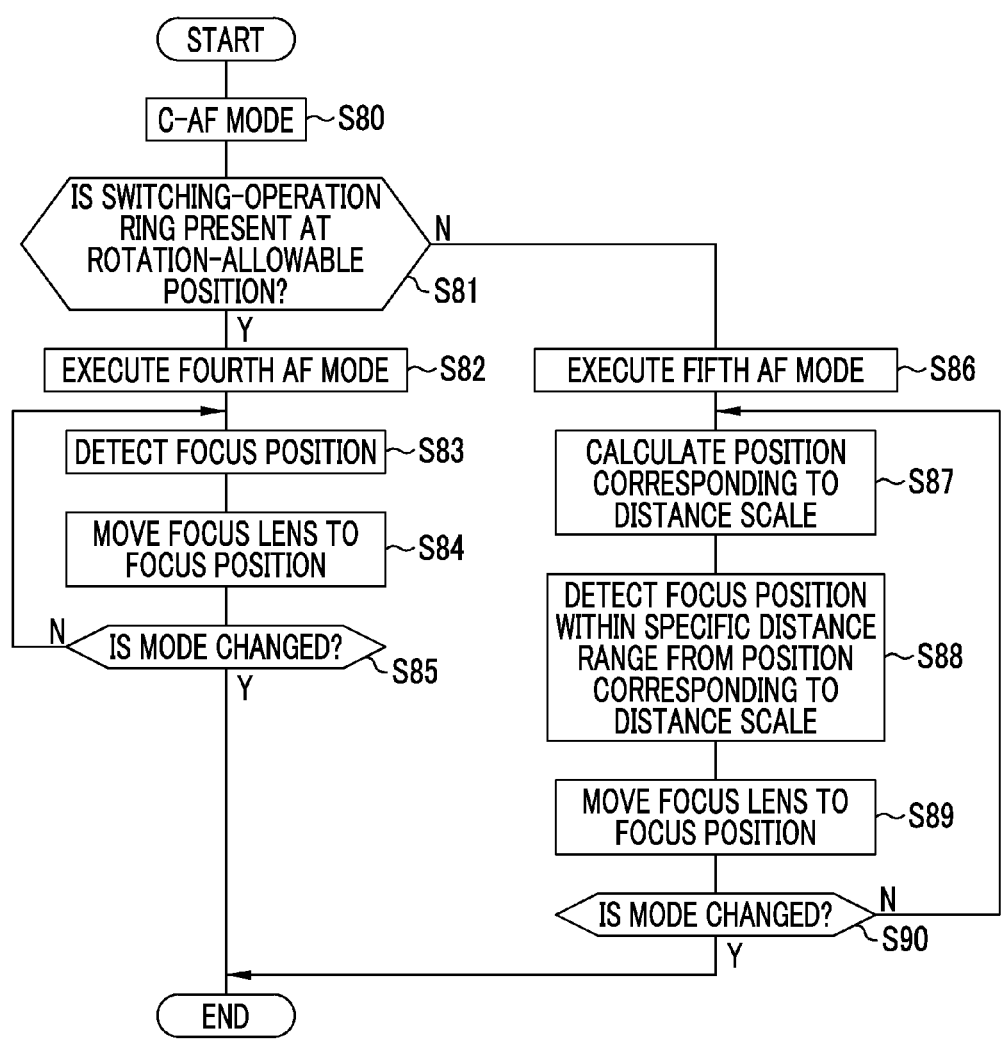
FIG. 22 is a flow chart showing procedures for moving the focus lens of a fourth AF mode and a fifth AF mode in the C-AF mode.

In a case in which the body control unit 100 selects the C-AF mode as shown in FIG. 22 (S80), the body control unit 100 determines whether or not the output of the third sensor 82 represents that the switching-operation ring 36 is present at the rotation-allowable position (S81). Assuming that the output of the third sensor 82 represents that the switching-operation ring 36 is present at the rotation-allowable position (YES in S81), the body control unit 100 executes the fourth AF mode (S82). In the fourth AF mode, the body control unit 100 detects the focus position on the basis of the AF evaluation value (S83) and moves the focus lens 95 to the detected focus position (S84). Then, the body control unit 100 determines whether or not a mode is changed to the other mode from the fourth AF mode (S85). The detection of the focus position (S83) and the movement of the focus lens 95 (S84) are continued until a mode is changed (NO in S85). In this way, AF is repeatedly performed during the taking of a video in the fourth AF mode.

On the other hand, assuming that the output of the third sensor 82 represents that the switching-operation ring 36 is present at the rotation-restriction position (NO in S81), the body control unit 100 executes the fifth AF mode (S86). In the fifth AF mode, the body control unit 100 calculates the position of the focus lens 95, at which the imaging distance corresponding to the distance scale 46 set to the position of the index 76 is obtained, on the basis of the detection signal of the second sensor 52 (S87). The body control unit 100 detects the focus position within a specific distance range that includes the calculated position as a middle (S88). The body control unit 100 moves the focus lens 95 to the detected focus position (S89). Then, the body control unit 100 determines whether or not a mode is changed to the other mode from the fifth AF mode (S90). The calculation of the position corresponding to the distance scale 46 (S87), the detection of the focus position (S88), and the movement of the focus lens 95 (S89) are continued until a mode is changed (NO in S90). In this way, AF is repeatedly performed within a specific distance range, which is designated by a user, by the focus operation ring 32 in the fifth AF mode.

Since the rotation of the focus operation ring 32 in a limited angular range and the endless rotation of the focus operation ring 32 can be selectively switched by the movement of the switching-operation ring 36 in the direction of the optical axis as described above, the rotation of the focus operation ring 32, which is caused by mistake, is easily and reliably prevented at the time of switching of a manual mode.

In the embodiment, the respective parts of the lens barrel 12 have been controlled by the body control unit 100 provided in the camera body 11. However, the respective parts of the lens barrel 12 may be controlled by the lens control unit 91. In this case, the lens control unit 91 controls the motor driver 92 on the basis of the outputs of the first sensor 42, the second sensor 52, and the third sensor 82 in accordance with an imaging mode, and moves the focus lens 95. In a case in which the respective parts of the lens barrel 12 are controlled by the lens control unit 91, the control of the respective parts of the lens barrel 12 performed by the body control unit 100 may be inhibited.

Further, the distance scale 46 has been provided on the second connection ring 34 and the index 76 has been provided on the switching-operation ring 36 in the embodiment. However, the invention is not limited thereto, and the index 76 may be provided on the second connection ring 34 and the distance scale 46 may be provided on the switching-operation ring 36. In a case in which the distance scale 46 is provided on the switching-operation ring 36, the index 76 may be provided on the focus operation ring 32.

A contrast AF system, which searches for a high-contrast position and brings the high-contrast position into focus while moving the focus lens 95 on the basis of the image signal of the solid-state imaging element 22, has been used in the camera 10 of the embodiment. However, the invention is not limited thereto and a phase difference AF system may be used. A solid-state imaging element in which a plurality of phase difference detection pixels, which have a dependency on the angle of light to be incident on a light-receiving surface, are arranged on the light-receiving surface in a predetermined pattern is used in the phase difference AF system. The phase difference detection pixels are formed of first parallax pixels in which sensitivity to light to be incident from the right is high and second parallax pixels in which sensitivity to light to be incident from the left is high. A focus position is obtained from a shift length between an image that is formed by the plurality of first parallax pixels and an image that is formed by the plurality of second parallax pixels.

Furthermore, the camera body 11 and the lens barrel 12 have been formed of separate bodies and have been adapted to be detachably connected to each other in the camera 10 of the embodiment. However, the invention is not limited thereto, and an imaging device in which the camera body 11 and the lens barrel 12 are provided integrally with each other may be provided. Moreover, a mirrorless single-lens digital camera has been described by way of example, but the invention can also be applied to other lens-interchangeable digital cameras, such as a single lens reflex digital camera.

EXPLANATION OF REFERENCES

10: lens-interchangeable digital camera
11: camera body
12: lens barrel
22: solid-state imaging element
30: lens barrel body
31: imaging optical system
32: focus operation ring
33: first connection ring
34: second connection ring
35: cam ring
36: switching-operation ring
42: first sensor
52: second sensor
56: distance scale
76: index
82: third sensor
100: body control unit

What is claimed is:

1. A lens barrel comprising:
a lens barrel body that houses an imaging optical system including a focus lens;
a focus operation member that is mounted on the lens barrel body so as to be endlessly rotatable about an optical axis of the imaging optical system;
a rotation restricting member that is rotatable about the optical axis within a limited angular range and is movable between an engagement position at which the rotation restricting member is engaged with the focus operation member and a disengagement position at which the rotation restricting member is not engaged with the focus operation member in a direction of the optical axis; and
a switching-operation member that is mounted on the lens barrel body in an externally exposed state so as to be movable in the direction of the optical axis, and is movable between a rotation-restriction position at which the switching-operation member moves the rotation restricting member to the engagement position to restrict the rotation of the focus operation member within the angular range and a rotation-allowable position at which the switching-operation member moves the rotation restricting member to the disengagement position to allow the endless rotation of the focus operation member.

2. The lens barrel according to claim 1,
wherein the switching-operation member present at the rotation-allowable position is closer to the focus operation member than the switching-operation member present at the rotation-restriction position.

3. The lens barrel according to claim 2,
wherein the rotation restricting member is disposed closer to an inner diameter side of the lens barrel body than the focus operation member and the switching-operation member, and is covered with the focus operation member and the switching-operation member in a case in which the switching-operation member is present at the rotation-allowable position.

4. The lens barrel according to claim 3,
wherein a distance scale is provided on a portion of the rotation restricting member that is exposed to the outside without being covered with the focus operation member in a case in which the switching-operation member is present at the rotation-restriction position.

5. The lens barrel according to claim 4, further comprising:
a first sensor that detects the rotation of the focus operation member;
a second sensor that detects the angular position of the rotation restricting member;

a third sensor that detects the position of the switching-operation member; and
a drive unit that moves the focus lens in the direction of the optical axis on the basis of outputs of the first sensor, the second sensor, and the third sensor.

6. The lens barrel according to claim 5,
wherein the drive unit moves the focus lens on the basis of the output of the second sensor in a case in which the output of the third sensor represents that the switching-operation member is present at the rotation-restriction position.

7. The lens barrel according to claim 6, further comprising:
a control unit that controls the drive unit, executes a first manual focus mode in which the control unit moves the focus lens according to a rotational direction and a rotation angle obtained on the basis of the output of the first sensor in a case in which the output of the third sensor represents that the switching-operation member is present at the rotation-allowable position, and executes a second manual focus mode in which the control unit moves the focus lens according to the angular position detected by the second sensor in a case in which the output of the third sensor represents that the switching-operation member is present at the rotation-restriction position.

8. A method of controlling a lens barrel, the lens barrel including a lens barrel body that houses an imaging optical system including a focus lens, a focus operation member that is mounted on the lens barrel body so as to be endlessly rotatable about an optical axis of the imaging optical system, a rotation restricting member that is rotatable about the optical axis within a limited angular range and is movable between an engagement position at which the rotation restricting member is engaged with the focus operation member and a disengagement position at which the rotation restricting member is not engaged with the focus operation member in a direction of the optical axis, a switching-operation member that is mounted on the lens barrel body in an externally exposed state so as to be movable in the direction of the optical axis and is movable between a rotation-restriction position at which the switching-operation member moves the rotation restricting member to the engagement position to restrict the rotation of the focus operation member within the angular range and a rotation-allowable position at which the switching-operation member moves the rotation restricting member to the disengagement position to allow the endless rotation of the focus operation member, a first sensor that detects the rotation of the focus operation member, a second sensor that detects the angular position of the rotation restricting member, and a third sensor that detects the position of the switching-operation member, the method comprising:
executing a first manual focus mode in which the focus lens is moved according to a rotational direction and a rotation angle obtained on the basis of the output of the first sensor in a case in which the output of the third sensor represents that the switching-operation member is present at the rotation-allowable position; and
executing a second manual focus mode in which the focus lens is moved according to the angular position detected by the second sensor in a case in which the output of the third sensor represents that the switching-operation member is present at the rotation-restriction position.

9. A camera body to which the lens barrel according to claim 6 is detachably connected, the camera body comprising:
a control unit that controls the drive unit of the lens barrel, executes a first manual focus mode in which the control unit moves the focus lens according to a rotational direction and a rotation angle obtained on the basis of the output of the first sensor in a case in which the output of the third sensor represents that the switching-operation member is present at the rotation-allowable position, and executes a second manual focus mode in which the control unit moves the focus lens according to the angular position detected by the second sensor in a case in which the output of the third sensor represents that the switching-operation member is present at the rotation-restriction position.

10. The camera body according to claim 9, further comprising:
an imaging unit that takes an image with light emitted from the lens barrel body; and
a mode change-over switch that is used to select an auto-focus mode instead of the first manual focus mode and the second manual focus mode,
wherein the control unit obtains a focus position on the basis of an imaging signal obtained by the imaging unit and moves the focus lens to the focus position in a case in which the auto-focus mode is selected by the mode change-over switch.

11. The camera body according to claim 10,
wherein the control unit moves the focus lens according to the rotational direction and the rotation angle after moving the focus lens to the focus position in a case in which the auto-focus mode is selected by the mode change-over switch and the output of the third sensor represents that the switching-operation member is present at the rotation-allowable position.

12. The camera body according to claim 10,
wherein the control unit moves the focus lens on the basis of the output of the second sensor to obtain the focus position in a case in which the auto-focus mode is selected by the mode change-over switch and the output of the third sensor represents that the switching-operation member is present at the rotation-restriction position.

13. A method of controlling a camera body to which a lens barrel is detachably connected, the lens barrel including a lens barrel body that houses an imaging optical system including a focus lens, a focus operation member that is mounted on the lens barrel body so as to be endlessly rotatable about an optical axis of the imaging optical system, a rotation restricting member that is rotatable about the optical axis within a limited angular range and is movable between an engagement position at which the rotation restricting member is engaged with the focus operation member and a disengagement position at which the rotation restricting member is not engaged with the focus operation member in a direction of the optical axis, a switching-operation member that is mounted on the lens barrel body in an externally exposed state so as to be movable in the direction of the optical axis and is movable between a rotation-restriction position at which the switching-operation member moves the rotation restricting member to the engagement position to restrict the rotation of the focus operation member within the angular range and a rotation-allowable position at which the switching-operation member moves the rotation restricting member to the disengagement position to allow the endless rotation of the focus operation member, a first sensor that detects the rotation of the focus operation member, a second sensor that detects the angular position of the rotation restricting member, and a third sensor that detects the position of the switching-operation member, the method comprising:

executing a first manual focus mode in which the focus lens is moved according to a rotational direction and a rotation angle obtained on the basis of the output of the first sensor in a case in which the output of the third sensor represents that the switching-operation member is present at the rotation-allowable position; and executing a second manual focus mode in which the focus lens is moved according to the angular position detected by the second sensor in a case in which the output of the third sensor represents that the switching-operation member is present at the rotation-restriction position.

14. An imaging device comprising:

a lens barrel body that houses an imaging optical system including a focus lens;

a focus operation member that is mounted on the lens barrel body so as to be endlessly rotatable about an optical axis of the imaging optical system;

a rotation restricting member that is rotatable about the optical axis within a limited angular range and is movable between an engagement position at which the rotation restricting member is engaged with the focus operation member and a disengagement position at which the rotation restricting member is not engaged with the focus operation member in a direction of the optical axis;

a switching-operation member that is mounted on the lens barrel body in an externally exposed state so as to be movable in the direction of the optical axis, and is movable between a rotation-restriction position at which the switching-operation member moves the rotation restricting member to the engagement position to restrict the rotation of the focus operation member within the angular range and a rotation-allowable position at which the switching-operation member moves the rotation restricting member to the disengagement position to allow the endless rotation of the focus operation member;

a first sensor that detects the rotation of the focus operation member;

a second sensor that detects the angular position of the rotation restricting member;

a third sensor that detects the position of the switching-operation member; and a control unit that executes a first manual focus mode in which the control unit moves the focus lens according to a rotational direction and a rotation angle obtained on the basis of the output of the first sensor in a case in which the output of the third sensor represents that the switching-operation member is present at the rotation-allowable position, and executes a second manual focus mode in which the control unit moves the focus lens according to the angular position detected by the second sensor in a case in which the output of the third sensor represents that the switching-operation member is present at the rotation-restriction position.

15. The imaging device according to claim 14, further comprising:

an imaging unit that takes an image with light emitted from the lens barrel body; and a mode change-over switch that is used to select an auto-focus mode instead of the first manual focus mode and the second manual focus mode, wherein the control unit obtains a focus position on the basis of an imaging signal obtained by the imaging unit and moves the focus lens to the focus position in a case in which the auto-focus mode is selected by the mode change-over switch.

16. The imaging device according to claim 15, wherein the control unit moves the focus lens according to the rotational direction and the rotation angle after moving the focus lens to the focus position in a case in which the auto-focus mode is selected by the mode change-over switch and the output of the third sensor represents that the switching-operation member is present at the rotation-allowable position.

17. The imaging device according to claim 15, wherein the control unit moves the focus lens on the basis of the output of the second sensor to obtain the focus position in a case in which the auto-focus mode is selected by the mode change-over switch and the output of the third sensor represents that the switching-operation member is present at the rotation-restriction position.

18. A method of controlling an imaging device, the imaging device including a lens barrel body that houses an imaging optical system including a focus lens, a focus operation member that is mounted on the lens barrel body so as to be endlessly rotatable about an optical axis of the imaging optical system, a rotation restricting member that is rotatable about the optical axis within a limited angular range and is movable between an engagement position at which the rotation restricting member is engaged with the focus operation member and a disengagement position at which the rotation restricting member is not engaged with the focus operation member in a direction of the optical axis, a switching-operation member that is mounted on the lens barrel body in an externally exposed state so as to be movable in the direction of the optical axis and is movable between a rotation-restriction position at which the switching-operation member moves the rotation restricting member to the engagement position to restrict the rotation of the focus operation member within the angular range and a rotation-allowable position at which the switching-operation member moves the rotation restricting member to the disengagement position to allow the endless rotation of the focus operation member, a first sensor that detects the rotation of the focus operation member, a second sensor that detects the angular position of the rotation restricting member, and a third sensor that detects the position of the switching-operation member, the method comprising:

executing a first manual focus mode in which the focus lens is moved according to a rotational direction and a rotation angle obtained on the basis of the output of the first sensor in a case in which the output of the third sensor represents that the switching-operation member is present at the rotation-allowable position; and executing a second manual focus mode in which the focus lens is moved according to the angular position detected by the second sensor in a case in which the output of the third sensor represents that the switching-operation member is present at the rotation-restriction position.

\* \* \* \* \*